United States Patent
Makita et al.

(10) Patent No.: US 9,636,968 B2
(45) Date of Patent: May 2, 2017

(54) VEHICLE AIR CONDITIONER INCLUDING SUB-CASING SANDWICHED BY DIVISION CASINGS

(71) Applicant: CALSONIC KANSEI CORPORATION, Saitama (JP)

(72) Inventors: Yuki Makita, Saitama (JP); Shizuka Yanashima, Saitama (JP)

(73) Assignee: CALSONIC KANSEI CORPORATION, Saitama (JP)

( * ) Notice: Subject to any disclaimer, the term of this patent is extended or adjusted under 35 U.S.C. 154(b) by 468 days.

(21) Appl. No.: 13/724,113

(22) Filed: Dec. 21, 2012

(65) Prior Publication Data
US 2013/0160971 A1    Jun. 27, 2013

(30) Foreign Application Priority Data

Dec. 26, 2011  (JP) .................................. 2011-283324
Dec. 26, 2011  (JP) .................................. 2011-283610
Jan. 16, 2012   (JP) .................................. 2012-005936

(51) Int. Cl.
      *B60H 1/00*           (2006.01)
(52) U.S. Cl.
      CPC ..... *B60H 1/00528* (2013.01); *B60H 1/00021* (2013.01); *B60H 1/00521* (2013.01);
      (Continued)
(58) Field of Classification Search
      CPC ............ B60H 1/00528; B60H 1/00542; B60H 1/00692; B60H 1/00021; B60H 1/00521; B60H 2001/00092
      (Continued)

(56) References Cited

U.S. PATENT DOCUMENTS 5,062,473 A * 11/1991 Ostrand ............. B60H 1/00007
                                                                137/872
5,462,483 A * 10/1995 Loup .................. B60H 1/00071
                                                                454/152
(Continued)

FOREIGN PATENT DOCUMENTS

CN       101351349       1/2009
JP        5-58144           3/1993
(Continued)

OTHER PUBLICATIONS

Extended European Search report issued Apr. 17, 2013 in corresponding European Patent Application No. 12199284.6.
(Continued)

*Primary Examiner* — Ljiljana Ciric
(74) *Attorney, Agent, or Firm* — Wenderoth, Lind & Ponack, L.L.P.

(57) ABSTRACT

A vehicle air conditioner includes an evaporator configured to cool air, a heater core provided on a downstream side of the evaporator, a plurality of doors provided between the evaporator and the heater core, and a central air path formed on the downstream side of the evaporator. The central air path is provided with a first door of the plurality of doors, and a first side air path formed on a first side of the central air path. The central air path is further provided with a second door of the plurality of doors, a second side air path formed on a second side of the central air path, and a third door of the plurality of doors. A sub-casing is configured to form the central air path, and a first division casing and a second division casing are configured to sandwich the sub-casing.

7 Claims, 20 Drawing Sheets

(52) U.S. Cl.
CPC ..... *B60H 1/00542* (2013.01); *B60H 1/00692* (2013.01); *B60H 2001/00092* (2013.01)

(58) Field of Classification Search
USPC .......................................................... 165/42
See application file for complete search history.

(56) References Cited

U.S. PATENT DOCUMENTS

| | | | | |
|---|---|---|---|---|
| 5,755,107 | A * | 5/1998 | Shirota | B60H 1/00028 165/42 |
| 5,893,407 | A * | 4/1999 | Okamoto | B60H 1/0005 137/872 |
| 6,224,480 | B1 * | 5/2001 | Le | B60H 1/00692 454/156 |
| 6,270,400 | B1 * | 8/2001 | Tsurushima | B60H 1/00857 454/121 |
| 6,382,305 | B1 * | 5/2002 | Sano | B60H 3/0608 165/103 |
| 6,453,991 | B1 * | 9/2002 | Tsurushima | B60H 1/00064 165/202 |
| 6,568,468 | B1 * | 5/2003 | Uemura | B60H 1/00064 165/103 |
| 6,622,787 | B1 * | 9/2003 | Toyoshima | B60H 1/00064 165/203 |
| 7,108,599 | B2 * | 9/2006 | Kachi | B60H 1/00428 165/202 |
| 7,228,895 | B2 * | 6/2007 | Natsume | B60H 1/00064 165/204 |
| 7,247,088 | B2 * | 7/2007 | Sogame | B60H 1/00407 454/124 |
| 7,464,749 | B2 * | 12/2008 | Okumura | B60H 1/00064 165/202 |
| 7,478,666 | B2 * | 1/2009 | Yamamoto | B60H 1/00028 165/204 |
| 7,699,096 | B2 * | 4/2010 | Naruse | B60H 1/00828 165/103 |
| 7,806,172 | B2 * | 10/2010 | Seki | B60H 1/00685 165/202 |
| 7,931,074 | B2 * | 4/2011 | Itou | B60H 1/00028 165/101 |
| 7,967,063 | B2 * | 6/2011 | Sato | B60H 1/00664 137/630.14 |
| 8,328,608 | B2 * | 12/2012 | Kajiya | B60H 1/00471 454/141 |
| 8,511,371 | B2 * | 8/2013 | Onda | B60H 1/00685 165/202 |
| 8,757,245 | B2 * | 6/2014 | Richter | B60H 1/00028 165/139 |
| 9,221,318 | B2 * | 12/2015 | Uemura | B60H 1/00849 |
| 9,434,234 | B2 * | 9/2016 | Suzuki | B60H 1/00692 |
| 9,481,222 | B2 * | 11/2016 | Nakaya | B60H 1/00028 |
| 2001/0021635 | A1 | 9/2001 | Akahane | |
| 2001/0027861 | A1 * | 10/2001 | Tsurushima | B60H 1/0005 165/201 |
| 2003/0116205 | A1 | 6/2003 | Akahane | |
| 2003/0145978 | A1 * | 8/2003 | Tsurushima | B60H 1/00692 165/11.1 |
| 2004/0194947 | A1 * | 10/2004 | Ito | B60H 1/00028 165/203 |
| 2005/0142999 | A1 * | 6/2005 | Uemura | B60H 1/00692 454/152 |
| 2006/0057953 | A1 * | 3/2006 | Natsume | B60H 1/00692 454/161 |
| 2006/0130406 | A1 * | 6/2006 | Yoshida | B60H 1/00692 49/352 |
| 2006/0144582 | A1 * | 7/2006 | Sekiya | B60H 1/00692 165/202 |
| 2007/0111651 | A1 * | 5/2007 | Sekito | B60H 1/00692 454/121 |
| 2007/0158047 | A1 * | 7/2007 | Natsume | B60H 1/00021 165/43 |
| 2008/0017366 | A1 | 1/2008 | Koukouravas et al. | |
| 2008/0083241 | A1 * | 4/2008 | Nagata | B60H 1/00064 62/271 |
| 2009/0023374 | A1 * | 1/2009 | Suzuki | B60H 1/00692 454/126 |
| 2009/0117841 | A1 * | 5/2009 | Goto | B60H 1/00064 454/127 |
| 2009/0133422 | A1 | 5/2009 | Onda | |
| 2009/0241574 | A1 * | 10/2009 | Ozeki | B60H 1/00857 62/239 |
| 2009/0250193 | A1 * | 10/2009 | Ishikawa | B60H 1/00028 165/61 |
| 2010/0006258 | A1 | 1/2010 | Richter et al. | |
| 2012/0085115 | A1 * | 4/2012 | Kim | B60H 1/00064 62/239 |
| 2013/0008627 | A1 * | 1/2013 | Uemura | B60H 1/00849 165/96 |
| 2013/0319630 | A1 * | 12/2013 | Yamamoto | B60H 1/00764 165/42 |

FOREIGN PATENT DOCUMENTS

| | | |
|---|---|---|
| JP | 5-83227 | 11/1993 |
| JP | 10-205872 | 8/1998 |
| JP | 2000-272327 | 10/2000 |
| JP | 2001-270317 | 10/2001 |
| JP | 2001-270318 | 10/2001 |
| JP | 2001-270320 | 10/2001 |
| JP | 2008-80889 | 4/2008 |
| JP | 2009-1067 | 1/2009 |

OTHER PUBLICATIONS

Chinese Office Action (OA) issued Sep. 2, 2014 in corresponding Chinese Patent Application No. 201210597931.5.

* cited by examiner

A-A

SECT.D-D

VEHICLE AIR CONDITIONER INCLUDING SUB-CASING SANDWICHED BY DIVISION CASINGS

PRIORITY CLAIM

The present application is based on and claims priority from Japanese Patent Application No. 2011-283324, filed on Dec. 26, 2011, Japanese Patent Application No. 2011-283610, filed on Dec. 26, 2011, and Japanese Patent Application No. 2012-005936, filed on Jan. 16, 2012, the disclosures of which are hereby incorporated by reference in their entirety.

BACKGROUND

Field of the Invention

The present invention relates to a vehicle air conditioner including an air pathway structure having a plurality of separate air pathways.

Description of the Related Art

A vehicle air conditioner capable of independently adjusting a temperature in a front seat and a back seat of a vehicle, for example, is known (refer to JP 2001-270320A and JP2000-272327A).

The above vehicle air conditioner is configured such that two dividers are provided between an evaporator and a heater core provided in a casing along the air-flowing direction, three small air paths are formed by the two dividers, and a door is provided in each small air path to be slidable in the up and down direction. By sliding the door, the volume of air cooled by the evaporator, which flows to the heater core, and the volume of cooled air, which flows on the downstream side of the heater core through a bypass air path, are adjusted, the air which has passed through the bypass air path is mixed with the air which has passed through the heater core, and the mixture ratio is changed by sliding the door, so as to adjust an air temperature.

However, in such a vehicle air conditioner, since the dividers are held in the casing to form a plurality of separate air paths, the assembling operation of the dividers is a problem.

SUMMARY

It is, therefore, an object of the present invention to provide a vehicle air conditioner which can form a plurality of separate air paths with a simple assembling operation.

In order to achieve the above object, an embodiment of the present invention provides a vehicle air conditioner, including: an evaporator configured to cool air; a heater core provided on a downstream side of the evaporator; a plurality of doors provided between the evaporator and the heater core, the plurality of doors being configured to adjust the volume of the air cooled in the evaporator, which flows to the heater core, and the volume of the cooled air, which flows on the downstream side of the heater core through a bypass air path, the plurality of doors being configured to mix air which has passed through the bypass air path and air which has passed through the heater core, and change the ratio of the volume of the air passing through the bypass air path and the volume of the air passing through the heater core by adjusting an opening, so as to adjust a temperature of the mixed air; a central air path formed on the downstream side of the evaporator, and provided with a first door of the plurality of doors; a first side air path formed on one side of the central air path, and provided with a second door of the plurality of doors; a second side air path formed on the other side of the central air path, and provided with a third door of the plurality of doors; a sub-casing configured to form the central air path; and first and second division casings configured to sandwich the sub-casing from right and left, wherein the sub-casing and the first division casing form the first side air path, and the sub-casing and the second division casing form the second side air path.

BRIEF DESCRIPTION OF THE DRAWINGS

The accompanying drawings are included to provide further understanding of the invention, and are incorporated in and constitute a part of this specification. The drawings illustrate embodiments of the invention and, together with the specification, serve to explain the principle of the invention.

DETAILED DESCRIPTION OF THE PREFERRED EMBODIMENTS

Hereinafter, embodiments of a vehicle air conditioner will be described with reference to the drawings.

EMBODIMENTS

First Embodiment

Figure 10:
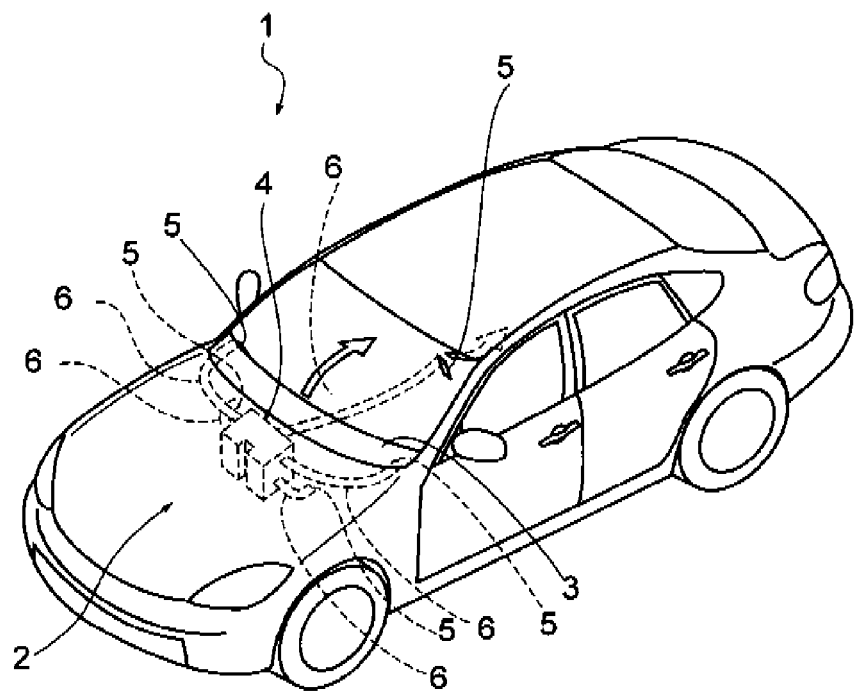
FIG. 10 is a view illustrating a vehicle in which the vehicle air conditioner according to the embodiments of the present invention is provided.
Figure 11:
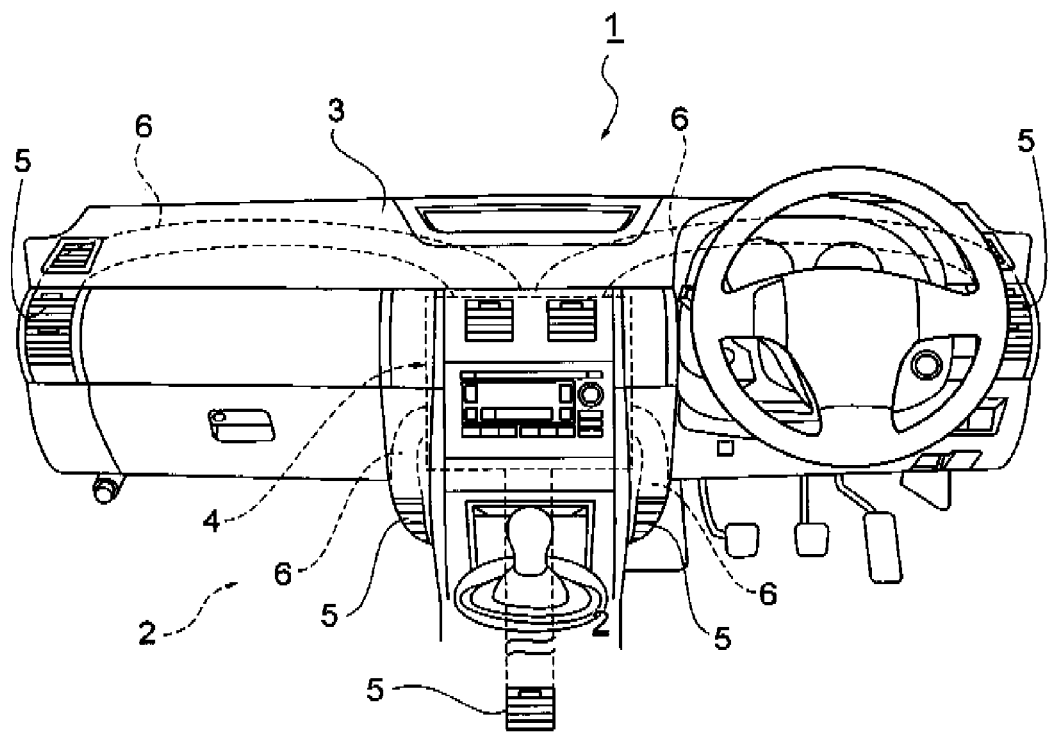
FIG. 11 is a view illustrating a positional relationship between an instrument panel and an air conditioner main body.

As illustrated in FIGS. 10, 11, an air conditioner 2 is provided in a vehicle 1 such as an automobile.

The air conditioner 2 includes a main body 4 provided inside an instrument panel 3 disposed in a front portion of a vehicle interior, and a duct 6 which sends air-conditioning air to an outlet 5 provided in each portion of the vehicle interior from the main body 4.

Figure 1:
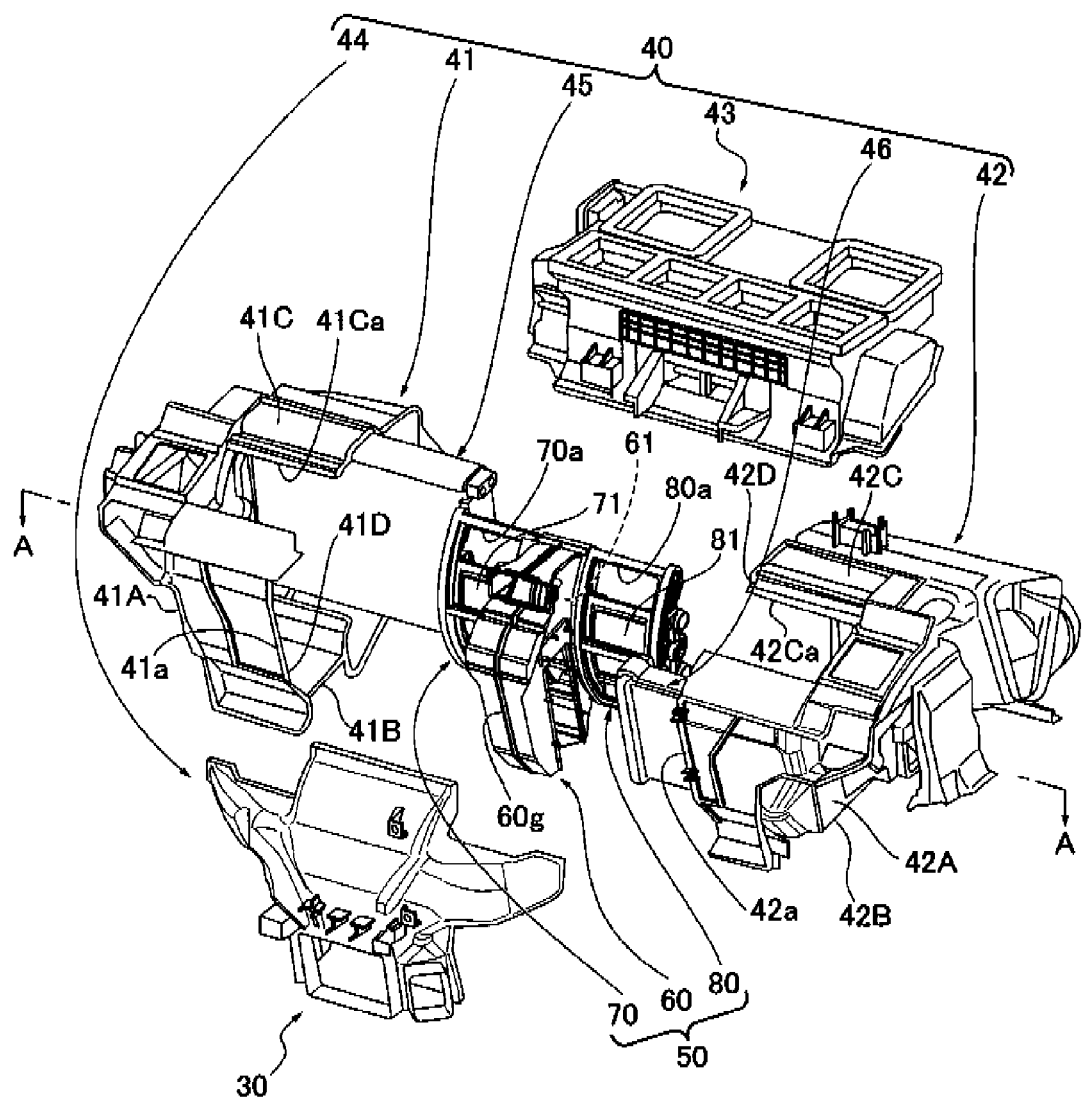
FIG. 1 is an exploded perspective view illustrating a configuration of a unit housing of a vehicle air conditioner according to embodiments of the present invention.

As illustrated in FIG. 1, the main body 4 includes a unit housing 40, an evaporator 45 which cools air, a heater core 46 which warms air, and an air mix door 50 which mixes cooled air and warmed air so as to adjust an air temperature.

[Unit Housing]

The unit housing 40 includes a left division casing 41 (first division casing) located on the left side in FIG. 1, a right division casing 42 (second division casing) located on the right side in FIG. 1, an air distribution mode module 43, and a food duct connection portion 44.

[Left Division Casing]

Figure 2:
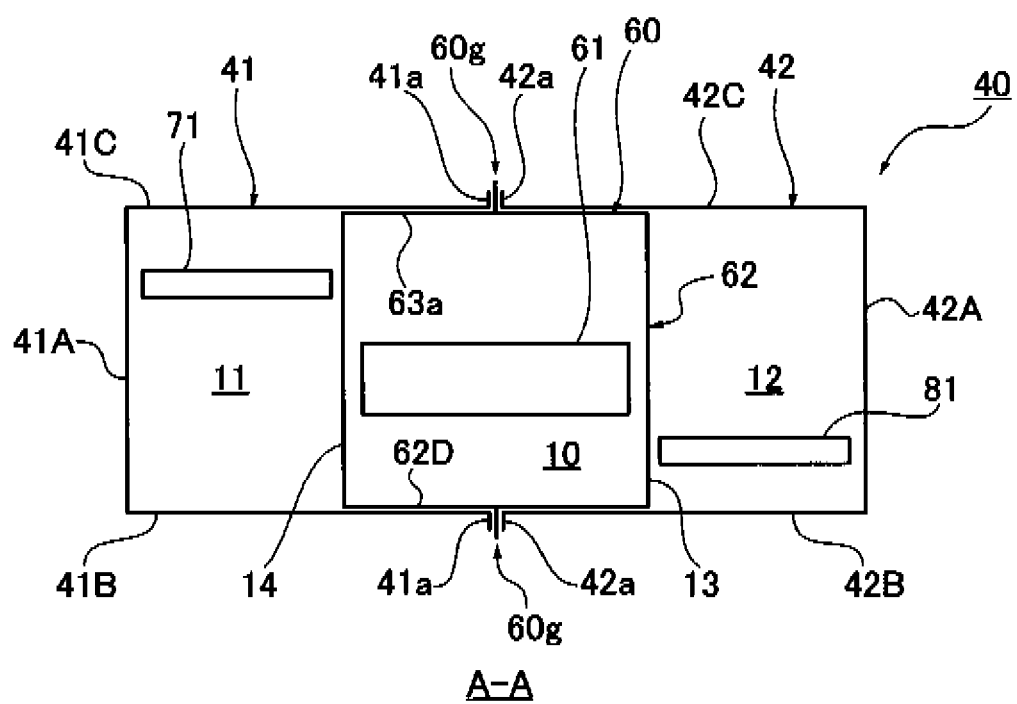
FIG. 2 is a concept view illustrating three separate air paths.

The left division casing 41 includes a left side wall portion 41A, bottom wall portion 41B and upper wall portion 41C which form a left air path 11 (first side air path) illustrated in FIG. 2, and includes on the right side surface thereof an opening 41D. A flange 41a is formed in the end portion of the opening 41D (refer to FIG. 1) along the rim of the opening 41D. The left half of the evaporator 45, the left half of the heater core 46, and the left half of the air mix door 50 are disposed in the left division casing 41.

A cutout 41Ca which connects the left air path 11 and the air distribution mode module 43 is formed in the upper wall portion 41C of the left division casing 41.

[Right Division Casing]

The right division casing 42 includes a right side wall portion 42A, bottom wall portion 42B and upper wall portion 42C which form a right air path 12 (second side air path) illustrated in FIG. 2, and includes on the left side surface thereof an opening 42D. A flange 42a is formed in the end portion of the opening 42D (refer to FIG. 1) along the rim of the opening 42D. The right half of the evaporator 45, the right half of the heater core 46 and the right half of the air mix door 50 are disposed in the right division casing 42.

A cutout 42Ca which connects the right air path 12 and the air distribution mode module 43 is formed in the upper wall portion 42C of the right division casing 42.

[Air Mix Door]

Figure 5:
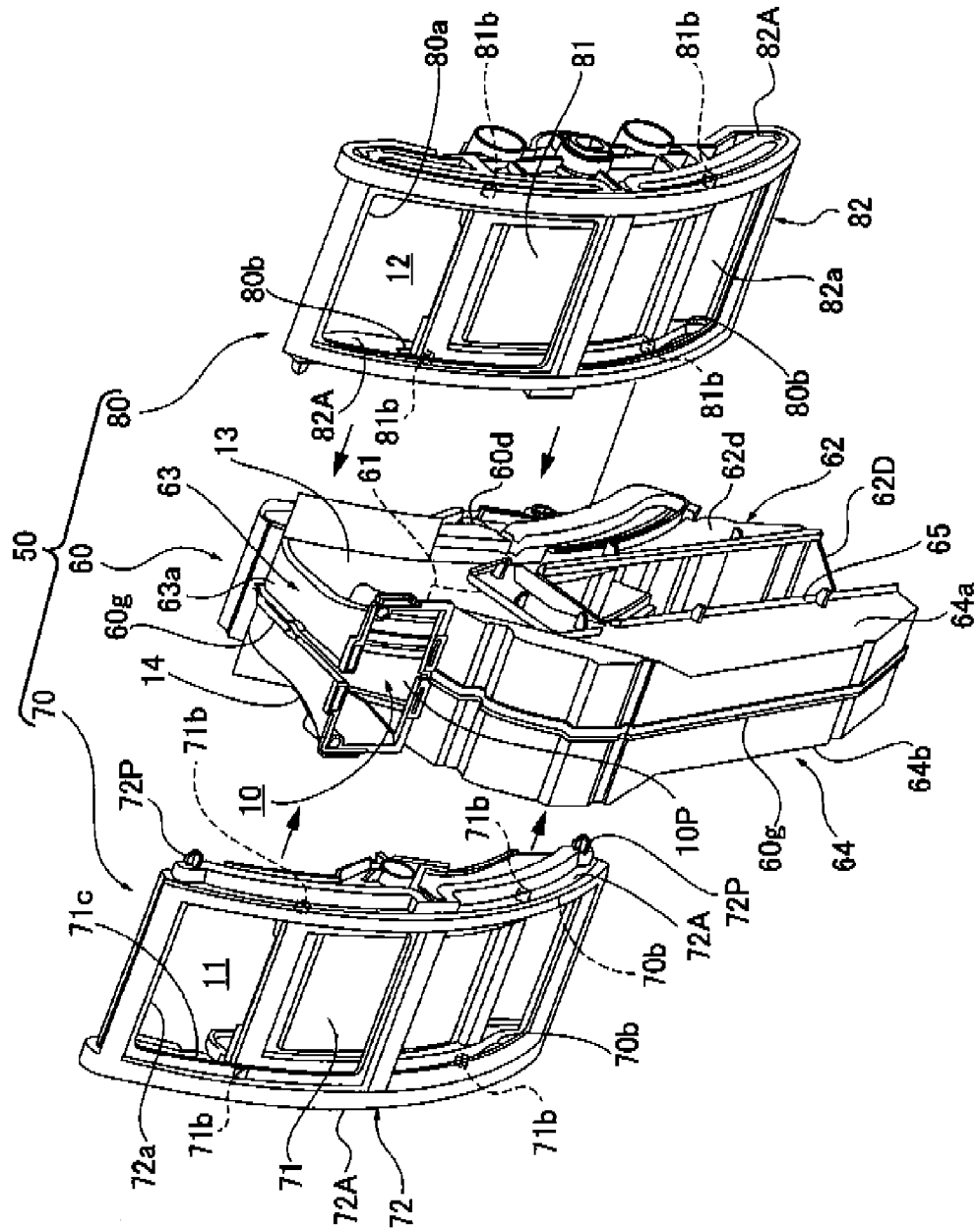
FIG. 5 is an exploded perspective view illustrating a configuration of an air mix door.

The air mix door 50 includes a central sub-casing unit (sub-casing unit) 60 in which a central air path 10 (refer to FIG. 2) is formed, left slide door unit 70 and right slide door unit 80 as illustrated in FIG. 5. The left slide door unit 70 is disposed in the left air path 11 and the right slide door unit 80 is disposed in the right air path 12.

[Central Sub-Casing Unit]

Figure 6:
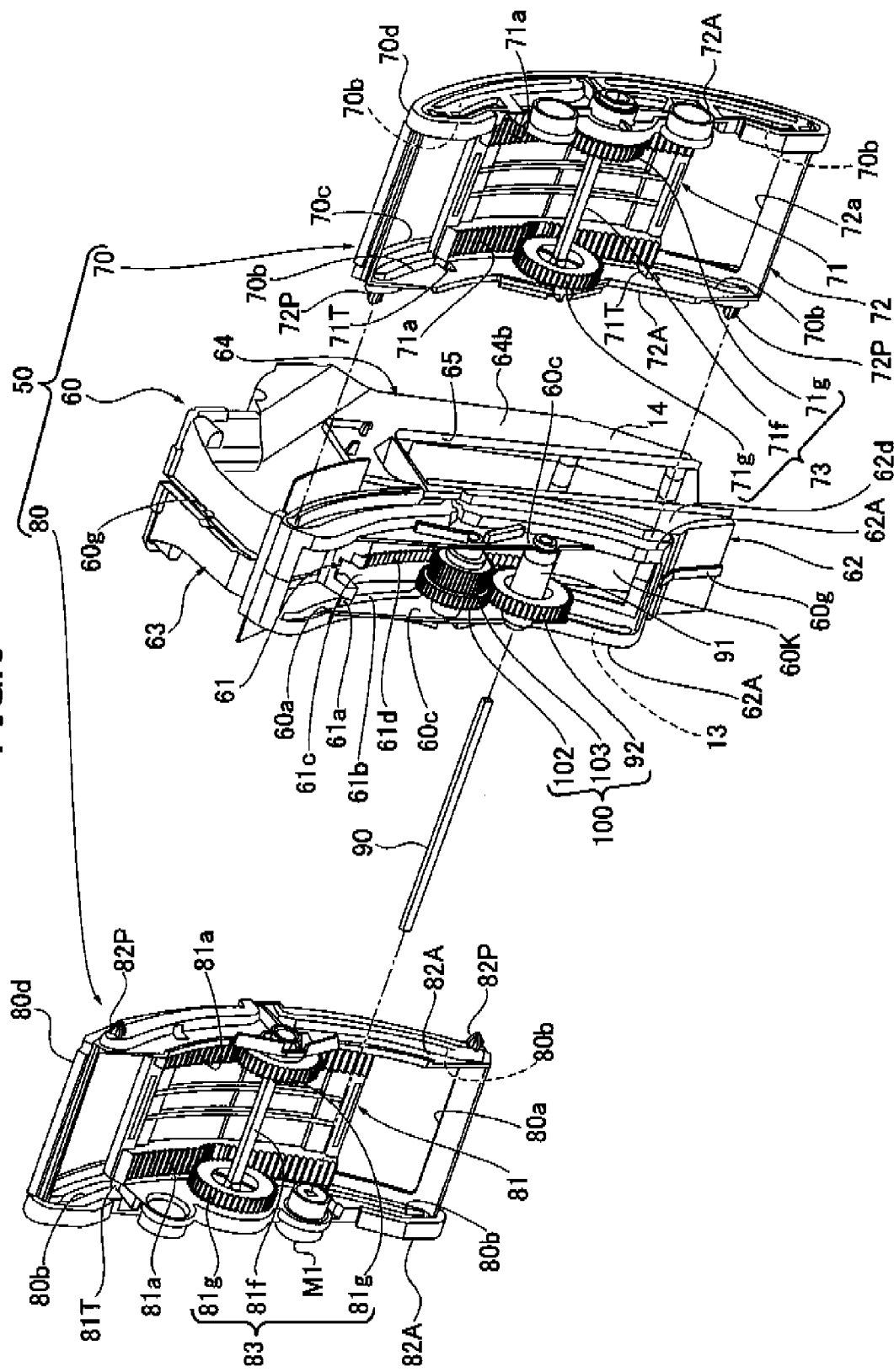
FIG. 6 is an exploded perspective view as seen from the back side of FIG. 5.

The central sub-casing unit 60 includes a sub-casing 62 in which an opening 60K having a rectangular shape in the front vision is formed, a central slide door (first door) 61 mounted on the sub-casing 62 to be slidable in the up and down direction, and a slide mechanism (moving mechanism) 100 which slides the central slide door 61 in the up and down direction as illustrated in FIGS. 5, 6.

Figure 8:
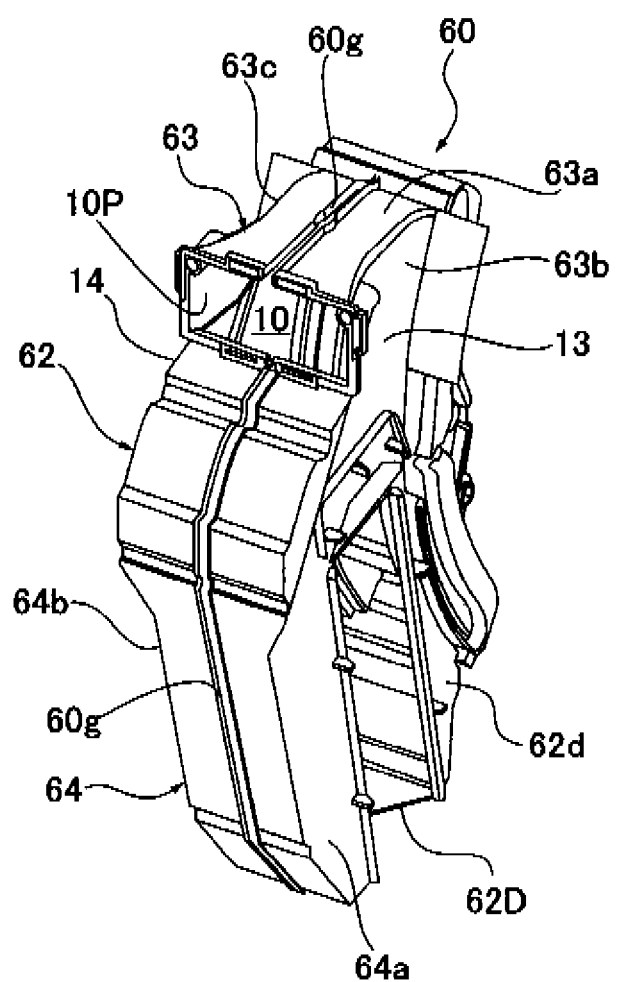
FIG. 8 is a perspective view illustrating a center sub-casing.

As illustrated in FIG. 8, the sub-casing 62 includes in the upper portion thereof a bypass air path wall portion 63 which forms a bypass air path 10P extending toward the downstream side and a warm air path wall portion 64 which forms a warm air path 64H (refer to FIG. 4) for guiding the air warmed by the heater core 46 on the side of the bypass air path 10P, and forms the central air path 10 as illustrated in FIG. 2.

A flange 60g is formed on the upper surface of the bypass air path wall portion 63 and the outer surface of the warm air path wall portion 64.

Figure 4:
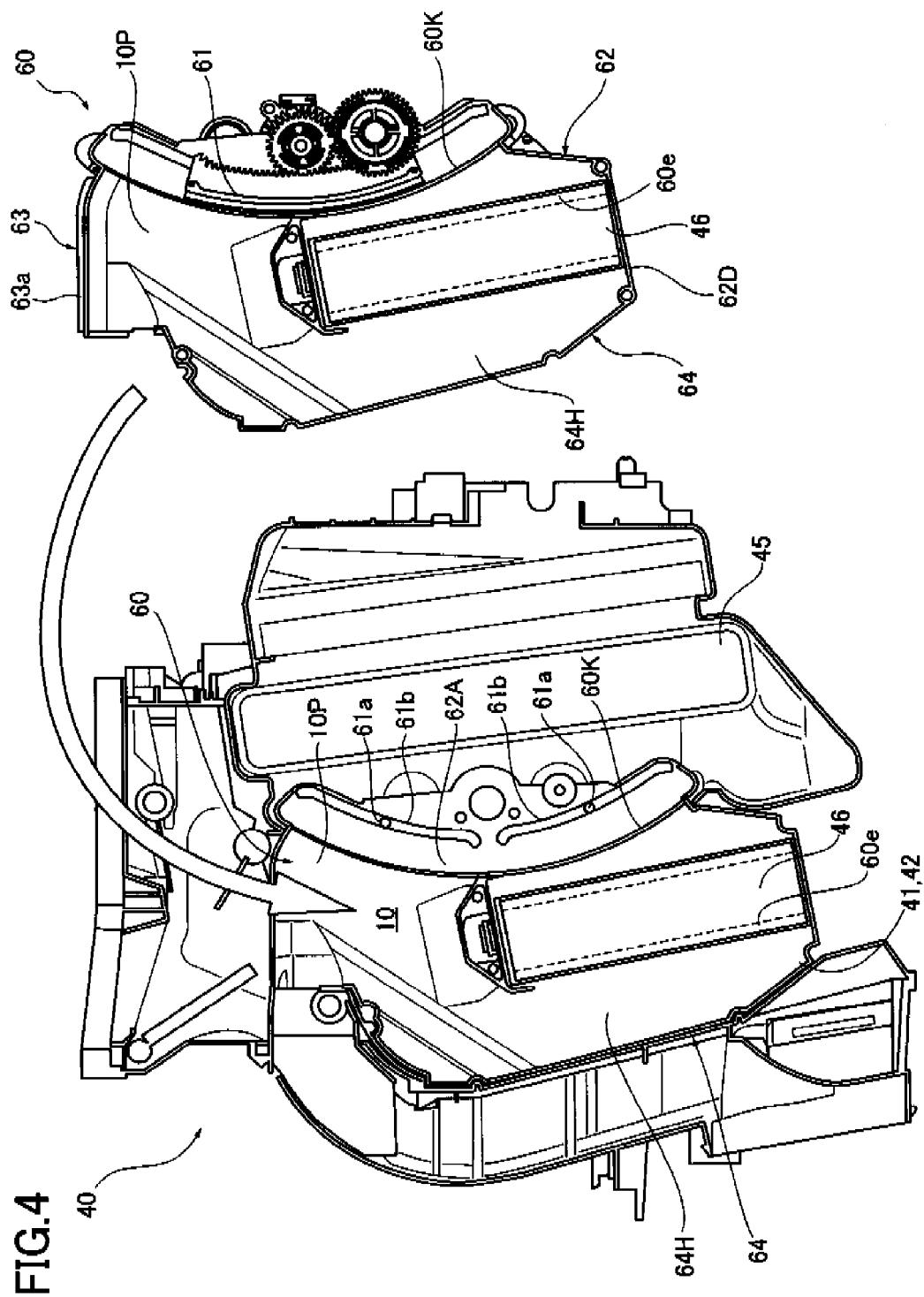
FIG. 4 is a sectional view illustrating the configuration of the unit housing in FIG. 1.

The side walls 13, 14 of the sub-casing 62 form the side walls of the central air path 10 as illustrated in FIG. 2, and form side wall portions 63b, 63c of the bypass air path wall portion 63, side wall portions 64a, 64b of the warm air path wall portion 64 and a wall 62d from the opening 60K to the heater core 46 (refer to FIG. 4).

As illustrated in FIG. 2, the upper wall portion 63a of the bypass air path wall portion 63 forms the upper wall portion of the central air path 10 (refer to FIG. 5). The upper wall portion 63a has contact with upper wall portions 41C, 42C of the right and left division casings 41, 42.

The bottom wall portion 62D of the sub-casing 62 (refer to FIG. 4) forms the bottom wall portion of the central air path 10, and the bottom wall portion 62D has contact with the bottom wall portion 41B, 42B of the right and left division casings 41, 42.

The central air path 10 includes the bypass air pathway 10P and an air path from the opening 60K to the upper portion of the warm air path 64H through the heater core 46 as illustrated in FIG. 4.

A concave portion 65 is formed in the sub-casing 62 between the side walls 13, 14 and the warm air path wall portion 64. The central portion of the heater core 46 is inserted in the concave portion 65.

As illustrated in FIG. 6A, a pair of ribs 62A, 62A facing to each other is formed on both right and left sides of the back surface of the sub-casing 62 (the surface on the upstream side to the opening 60K), and four guide grooves 61b (refer to FIG. 4) each having an arc-like shape along the up and down direction are formed in the upper portion and the lower portion of the inner surfaces of the ribs 62A, 62A, respectively.

[Slide Mechanism]

The slide mechanism 100 includes a driving gear 92 rotatably mounted between a pair of supporting walls 60c, 60c formed in the ribs 62A, 62A of the sub-casing 62, a first driven gear 102 which meshes with the driving gear 92, and a second driven gear 103 integrally formed in the first driven gear 102. The second driven gear 103 meshes with a rack 61d of the central slide door 61, and the central slide door 61 slides in the up and down direction through the first and second driven gears 102, 103 by the rotation of the driving gear 92.

Four projections 61a are formed in the upper portion and the lower portion of both side portions of the central slide door 61, and the four projections 61a (one projection is only illustrated in FIG. 6) are inserted in the guide grooves 61b of the ribs 62A of the sub-casing 62, respectively, so that the central slide door 61 is guided by the guide grooves 61b to slide.

The driving gear 92 is connected to a connection shaft 90 connected to a driving shaft of a motor M1 provided in the right slide door unit 80, and rotates by the driving of the motor M1 through the connection shaft 90.

If the central slide door 61 is moved upward, the upper portion of the opening 60K is closed, so that the volume of air flowing in the bypass air path 10P is decreased. In this case, the lower portion of the opening 60K opens, so that the volume of air flowing in the heater core 46 is increased. On the other hand, if the central slide door 61 is moved downward, the lower portion of the opening 60K is closed, so that the volume of air flowing in the heater core 46 is decreased. In this case, the upper portion of the opening 60K opens, so that the volume of air flowing in the bypass air path 10P is increased.

The air which has passed through the bypass air pathway 10P and the air which has passed through the warm air path 64H are mixed on the leading end side of the bypass air path wall portion 63, and the mixture ratio is changed by the sliding of the central slide door 61, so that the air temperature is adjusted. The temperature-adjusted air is sent to a back seat in a vehicle, for example.

[Left Slide Door Unit]

The left slide door unit 70 includes a frame 72 in which a rectangular opening 72a in a front view is formed, a left slide door (second door) 71 provided in the back surface of the frame body 72 (on the surface which becomes the upstream side to the opening 72a) to be slidable in the up and down direction, and a left slide mechanism 73 which slides the left slide door 71 in the up and down direction.

Ribs 72A, 72A are formed on both sides of the back surface of the frame body 72. Four guide grooves 70b are formed in the upper portion and the lower portion of the inner surfaces of the ribs 72A, 72A. Each guide groove 70b is formed in an arc-like shape along the up and down direction.

Projections 72P, 72P are formed in the upper portion and the lower portion of the right side surface of the frame 72 in FIG. 5.

[Left Slide Mechanism]

The left slide mechanism 73 includes a pair of gears 71g, 71g rotatably mounted on the ribs 72A, 72A of the frame 72 as illustrated in FIG. 6 and a not-shown motor which rotates the gears 71g, 71g.

The gears 71g, 71g are fastened to both end portions of a shaft 71f, and the shaft 71f is rotatably held by the ribs 72A, 72A. The gears 71g, 71g mesh with racks 71a, 71a formed in the back surface of the left slide door 71, and the left slide door 71 slides in the up and down direction by the rotation of the gears 71g, 71g.

Four projections 71T (two projections are only illustrated in FIG. 6) are formed in the upper portion and the lower portion of the left slide door 71. The four projections 71T are inserted into the guide grooves 70b of the ribs 72A, 72A of the frame 72, so that the left side door 71 is guided by the guide grooves 70b to slide.

If the left slide door 71 is moved upward, the upper portion of the opening 72a is closed, so that the volume of air flowing in a not-shown left bypass air path is decreased. In this case, the lower portion of the opening 72a opens, so that the volume of air flowing in the heater core 46 is increased. On the other hand, if the left slide door 71 is moved downward, the lower portion of the opening 72a is closed, so that the volume of air flowing in the heater core 46 is decreased. In this case, the upper portion of the opening 72a opens, so that the volume of air flowing in the left bypass air path is increased.

The air which has passed through the left bypass air path and the air which has passed through the heater core 46 are mixed, and the mixture ratio is changed by the sliding of the left side door 71, so that the air temperature is adjusted. This air is sent to the passenger's seat side of the vehicle 1, for example, through the air distribution mode module 43.

The left bypass air path and the left warm air path from the opening 72a to the bypass air path through the heater core 46 are formed by the left division casing 41 and the sub-casing 62 of the central sub-casing unit 60. The left bypass air path and the left warm air path form the left air path 11. The left air path 11 is an air path independent of the central air path 10.

[Right Slide Door Unit]

The right slide door unit 80 includes a frame 82 in which a rectangular opening 82a in the front view is formed, a right slide door (third door) 81 provided in the back surface of the frame 82 to be slidable in the up and down direction and a right slide mechanism 83 which slides the right slide door 81 in the up and down direction.

Ribs 82A, 82A are formed in both sides of the back surface of the frame 82. Four guide grooves 80b are formed in the upper portion and the lower portion of the inner surfaces the ribs 82A, 82A. Each guide groove 80b is formed in an arc-like shape along the up and down direction.

Projections 82P, 82P are formed in the upper portion and the lower portion of the right side surface of the frame 82 in FIG. 6.

[Right Slide Mechanism]

The right slide mechanism 83 includes a pair of gears 81g, 81g rotatably mounted on the ribs 82A, 82A of the frame 82 as illustrated in FIG. 6, and a not-shown motor which rotates the gears 81g, 81g.

The gears 81g, 81g are fastened to both end portions of a shaft 81f. The shaft 81f is rotatably held by the ribs 82A, 82A. The gears 81g, 81g mesh with racks 81a, 81a formed in the back surface of the right slide door 81, so that the right slide door 81 slides in the up and down direction by the rotation of the gear 81g, 81g.

Four projections 81T (one projection is only illustrated in FIG. 6) are formed in the upper portion and the lower portion of the right slide door 81, and the four projections 81T are inserted into the guide grooves 80b of the ribs 82A, 82A of the frame 82, so that the right slide door 81 is guided by the guide grooves 80b to slide.

If the right slide door 81 is moved upward, the upper portion of the opening 82a is closed, so that the volume of air flowing in a not-shown right bypass air path is decreased. In this case, the lower portion of the opening 82a opens, so that the volume of air flowing in the heater core 46 is increased. On the other hand, if the right slide door 81 is moved downward, the lower portion of the opening 82a is closed, so that the volume of air flowing in the heater core 46 is decreased. In this case, the upper portion of the opening 82a opens, so that the volume of air flowing in the right bypass air path is increased.

The air which has passed through the right bypass air path is mixed with the air which has passed through the heater core 46, and the mixture ratio is changed by the sliding of the right slide door 81, so that the air temperature is adjusted. The air is sent to the driver's seat side of the vehicle 1, for example, through the air distribution mode module 43.

The right bypass air path and the right warm air path from the opening 42a to the right bypass air path through the heater core 46 are formed by the right division casing 42 and the sub-casing 62 of the central sub-casing unit 60, and the right air path 12 (refer to FIG. 2) is formed by the right bypass air path and the right warm air path. This right air path 12 is an air path independent of the central air path 10

The air mix door 50 and the right and left division casings 41, 42 constitute an air path structure.

[Assembling of Air Mix Door]

Figure 7:
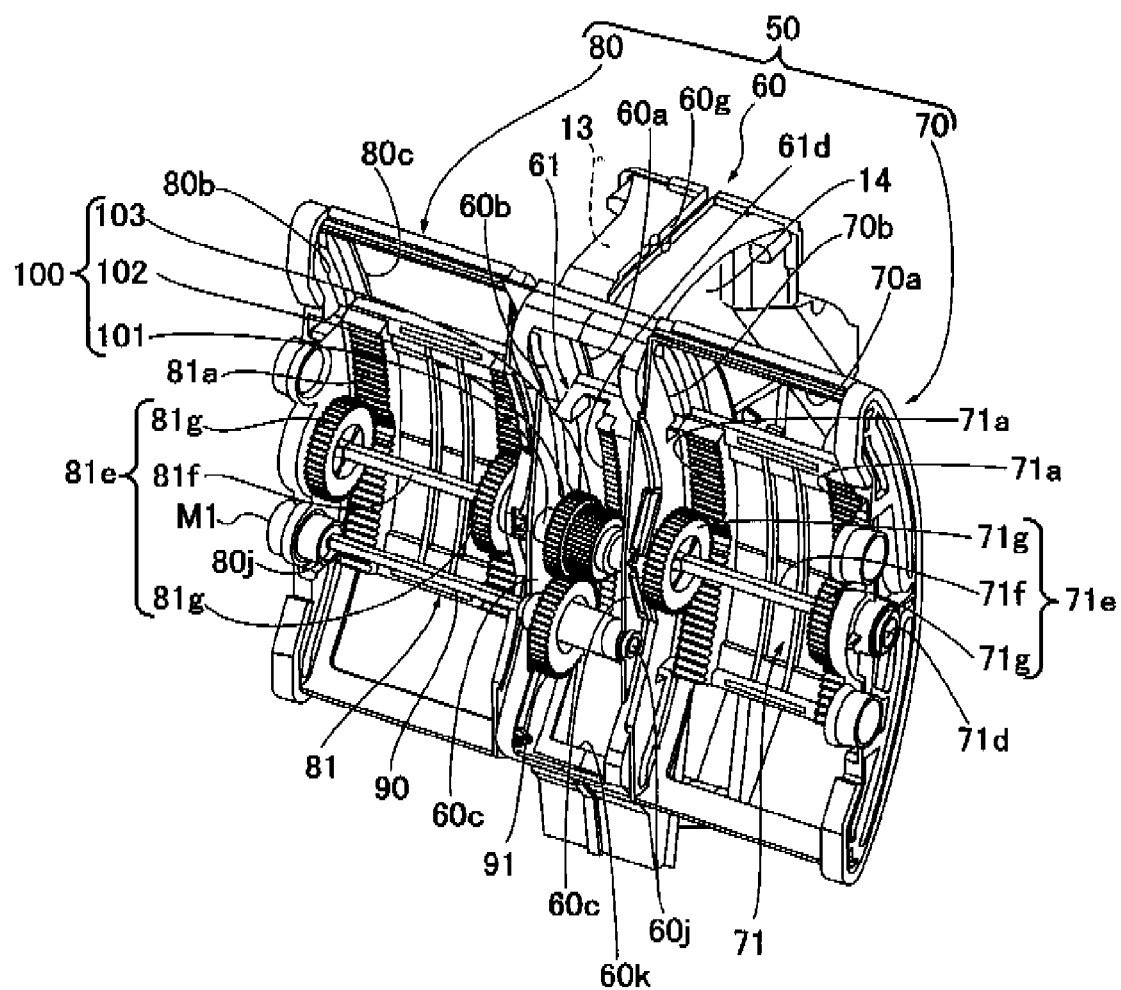
FIG. 7 is a perspective view illustrating the air mix door

As illustrated in FIGS. 5, 6, the projections 72P, 72P of the frame 72 of the left slide door unit 70 are pressed in not-shown holes of the left side surface (FIG. 5) of the sub-casing 62 of the central sub-casing unit 60, so that the left slide door unit 70 is assembled on the left side of the central sub-casing unit 60. The projections 82P, 82P of the frame 82 of the right slide door unit 80 are pressed into not-shown holes of the right side surface of the sub-casing 62 of the central sub-casing unit 60, so that the right slide door unit 80 is assembled on the right side of the central sub-casing unit 60. Accordingly, the air mix door 50 is assembled as illustrated in FIG. 7.

[Assembling of Unit Housing]

After assembling the air mix door 50, as illustrated in FIG. 1, for example, the evaporator 45 is disposed in the left division casing 41, the heater core 46 is disposed in the right division casing 42, the air mix door 50 is sandwiched from the right and left direction by the left division casing 41 and the right division casing 42, and the right and left slide door units 70, 80 and the central sub-casing unit 60 of the air mix door 50 are inserted into the right and left division casings 41, 42.

As illustrated in FIG. 2, the bottom wall portions 41B, 42B of the right and left division casings 41, 42 are overlapped with the bottom wall portion 62D of the sub-casing 62 of the central sub-casing unit 60, the upper wall portions 41C, 42C of the right and left division casings 41, 42 are overlapped with the upper wall portion 63a of the sub-casing 62, and the flange 41a of the left division casing 41 and the flange 42a of the right division casing 42 are jointed to sandwich therebetween the flange 60g of the central sub-casing unit 60. By this sandwiching, the sub-casing unit 60 is sandwiched by the right and left division casings 41, 42.

By the contact between the bottom wall portions 41B, 42B of the right and left division casings 41, 42 and between the upper wall portions 41C, 42C of the right and left division casings 41, 42 and the upper wall portion 63a of the sub-casing 62, the right and left air paths 11, 12 independent of the central air path 10 formed by the sub-casing 62 are formed.

By the contact between the flange 41a of the left division casing 41 and the flange 42a of the right division casing 42, the air leakage efficiency of the right and left air paths 11, 12 is improved. The air leakage efficiency of the right and left air paths 11, 12 can be further improved because the flanges 41a, 42a of the right and left division casings 41, 42 are jointed to sandwich therebetween the flange 60g of the central sub-casing unit 60.

Figure 3:
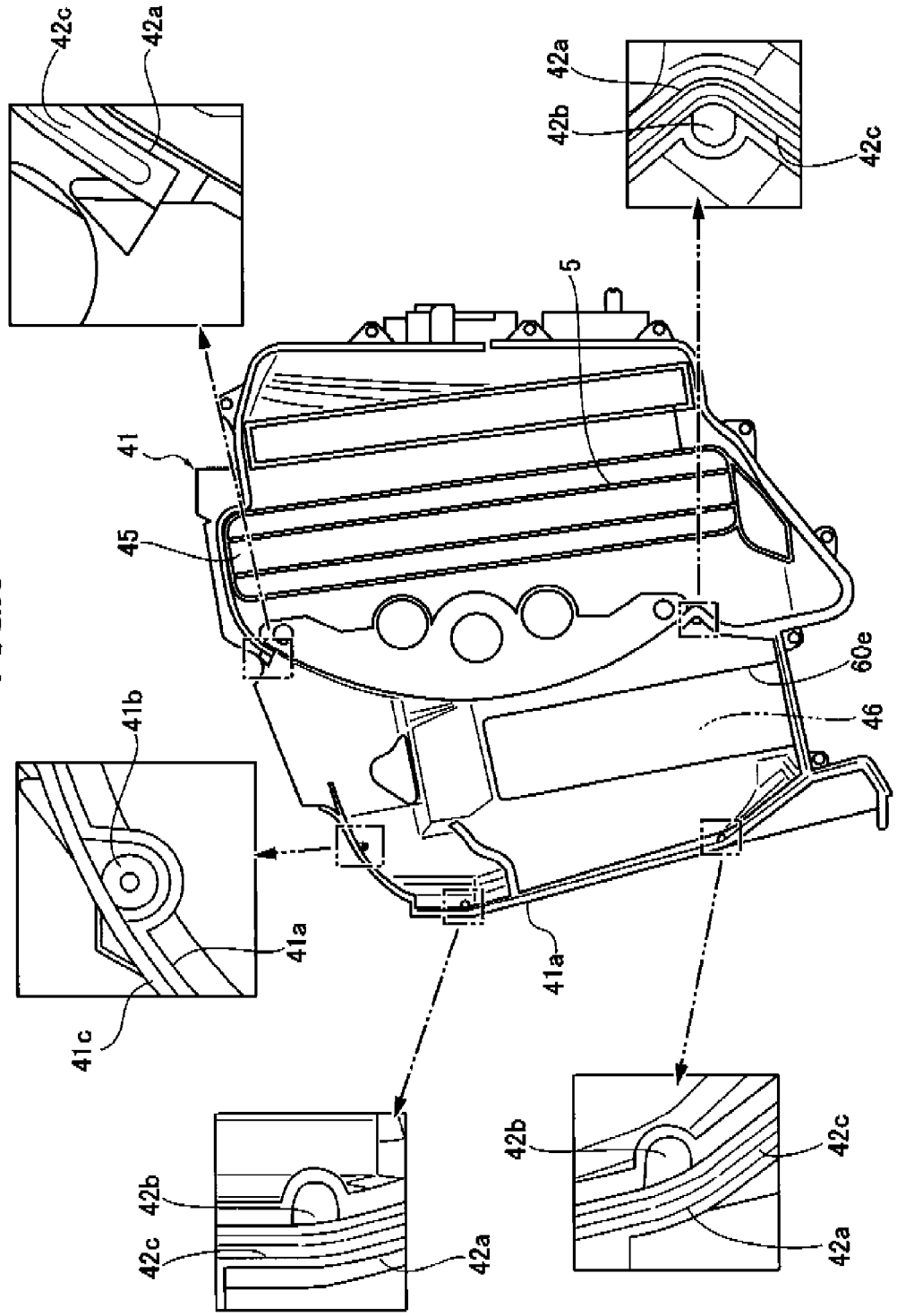
FIG. 3 is a perspective view illustrating a method of jointing a division casing.

For example, as illustrated in FIG. 3, a projection 41b and a convex portion 41c are formed in the flange 41a of the left division casing 41, and a concave portion 42b and a groove 42c are formed in the flange 42a of the right division casing 42 facing the projection 41b and the convex portion 41c. The projection 41b and the convex portion 41c of the flange 41a are pressed in the concave portion 42b and the groove 42c of the flange 42a, so that the flanges 41a, 42a are jointed. In this case, the height of the flange 60g is set to be short so as to avoid the interference with the flanges 41a, 42a As described above, by connecting the right and left division casings 41, 42 to sandwich the sub-casing unit 60 therebetween from the right and left, the left air path 11 and the right air path 12 independent of the central air path 10 can be formed on both the right and left sides of the central air path 10, as illustrated in FIG. 2, and the assembling operation can be easily performed. Therefore, it becomes unnecessary to assemble a divider for forming the right and left air paths 11, 12 independent of the central air path 10 as in the conventional technique.

Moreover, since the central sub-casing unit 60 includes the central slide door 61 and the slide mechanism 100, the air path structure can be easily constituted by assembling the right and left division casings 41, 42 to the central sub-casing unit 60, and the air path structure can be easily assembled.

Second Embodiment

Figure 9:
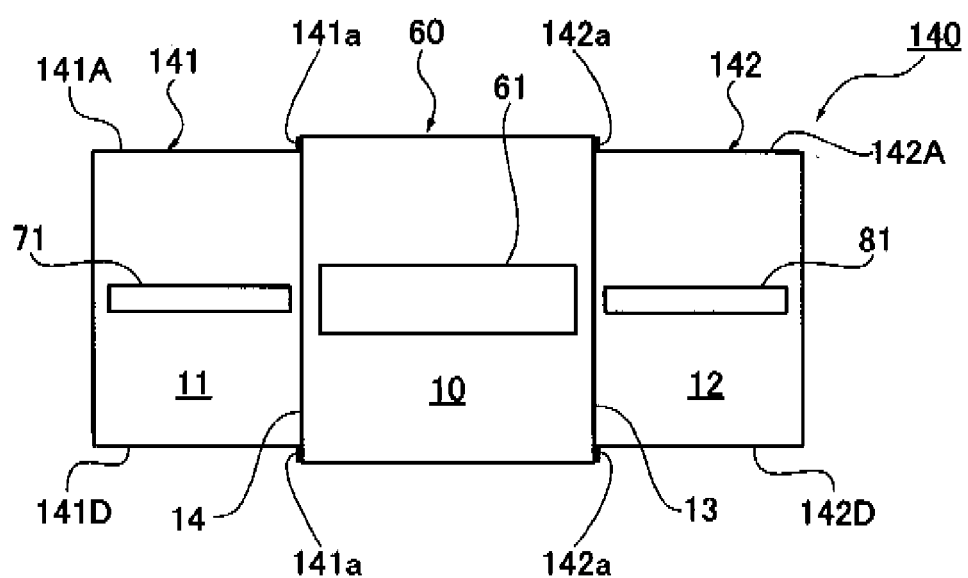
FIG. 9 is a view illustrating a second embodiment.

FIG. 9 illustrates a second embodiment. In this second embodiment, flanges 141a, 142a are formed in the edge portions of the openings of right and left division casings (first and second division casings) 141, 142, and these flanges 141a, 142a are jointed to the side walls 13, 14 of the sub-casing 62 of the central sub-casing unit (sub-casing unit) 60.

According to the second embodiment, the material of the right and left division casings 141, 142 can be saved because upper wall portions 141A, 142A and bottom wall portions 141D, 142D of the right and left division casings 141, 142 are not overlapped with the upper wall portion 63a and the bottom wall portion 62D of the sub-casing 62.

In the above embodiments, one central air path 10 is formed by the sub-casing 62, but a plurality of central air paths can be separately formed. In this case, a slide door can be provided in each central air path.

According to the above embodiments, a plurality of separate air paths can be formed by sandwiching the sub-casing by a pair of division casings from the right and left, and the assembling operation can be easily performed.

According to the above embodiments, the assembling of the air path structure can be easily performed by the sub-casing unit provided with the sub-casing, door and moving mechanism.

According to the above embodiments, the air leakage efficiency of the side air paths can be improved.

Hereinafter, a third embodiment of the present invention will be described with reference to the drawings.

Third Embodiment

FIG. 10 is a perspective view illustrating a vehicle 1 according to the third embodiment of the present invention. An air conditioner 2 is provided in the vehicle 1. This air conditioner 2 includes a main body 4 provided inside an instrument panel 3 disposed in the front portion of the vehicle interior and a duct 6 which sends air-conditioning air to an outlet 5 provided in each portion of the vehicle interior from the main body 4.

Figure 12:
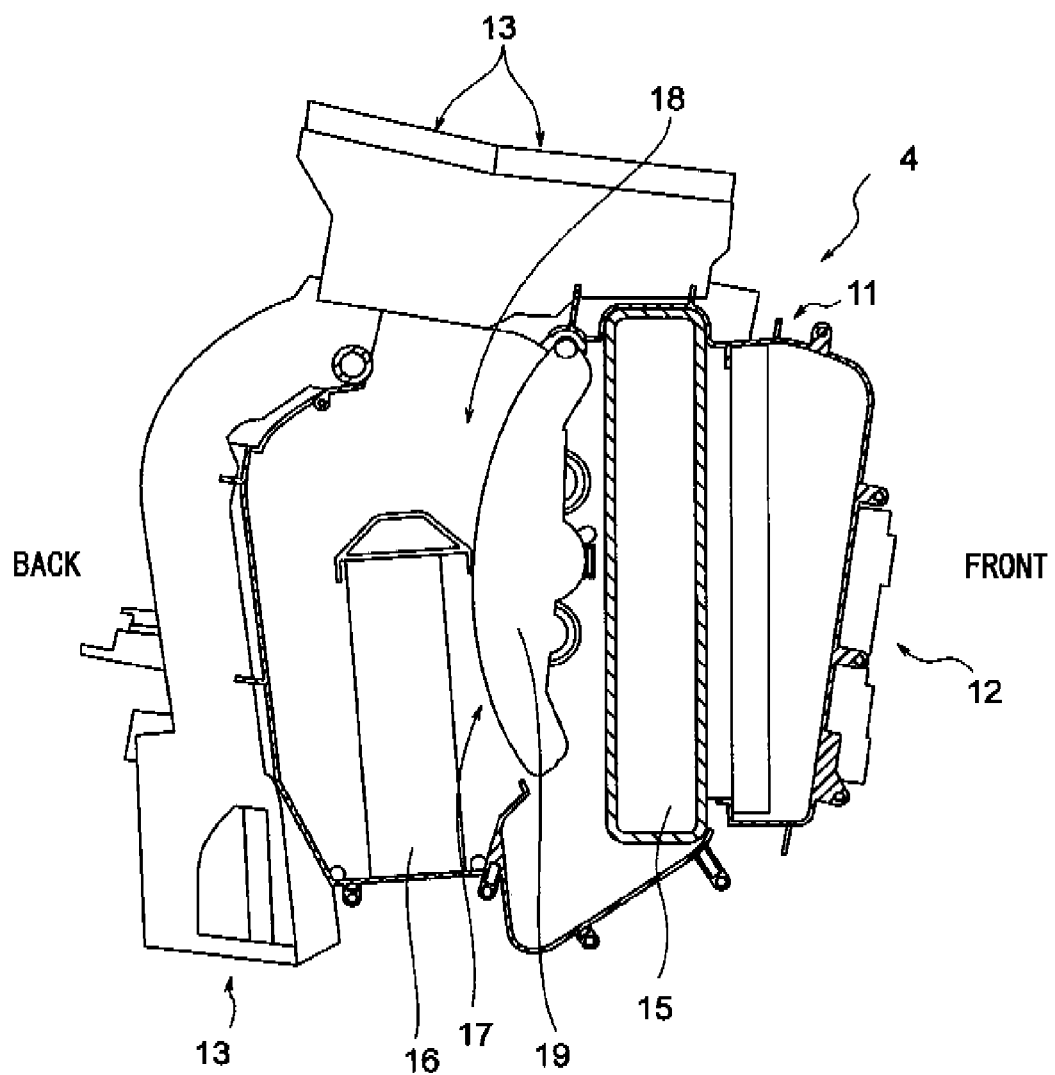
FIG. 12 is a sectional view of an air conditioner main body according to a third embodiment of the present invention.

As illustrated in FIG. 12, the main body 4 includes a hollow air-conditioning casing 11 and an air inlet 12 and a plurality of air outlets 13 provided in the air-conditioning casing 11. Each air outlet 13 is connected to each outlet 5 through the duct 6.

An evaporator 15 and heater core 16 are provided inside the air-conditioning casing 11 from the upstream side in order. The downstream side of the evaporator 15 is divided into a warm air path 17 and a bypass air path 18 by a not-shown division wall. The heater core 16 is provided in the warm air path 17.

In addition, the evaporator 15 cools air-conditioning air by using refrigerant evaporative latent heat for use in the air conditioner 2. The heater core 16 heats air-conditioning air by using the heat of the coolant water heated by an engine.

The area between the evaporator 15 and the heater core 16 is formed by three zones A-C (refer to FIG. 13) divided in right and left by a not-shown division wall in accordance with each outlet 5. An air mix door 19 is provided in this area. This air mix door 19 is disposed adjacent to the evaporator 15 such that the lower half thereof corresponds to the heater core 16. The air mix door 19 distributes the air-conditioning air which has passed through the evaporator 15 to the warm air path 16 and the bypass air path 18.

Figure 13:
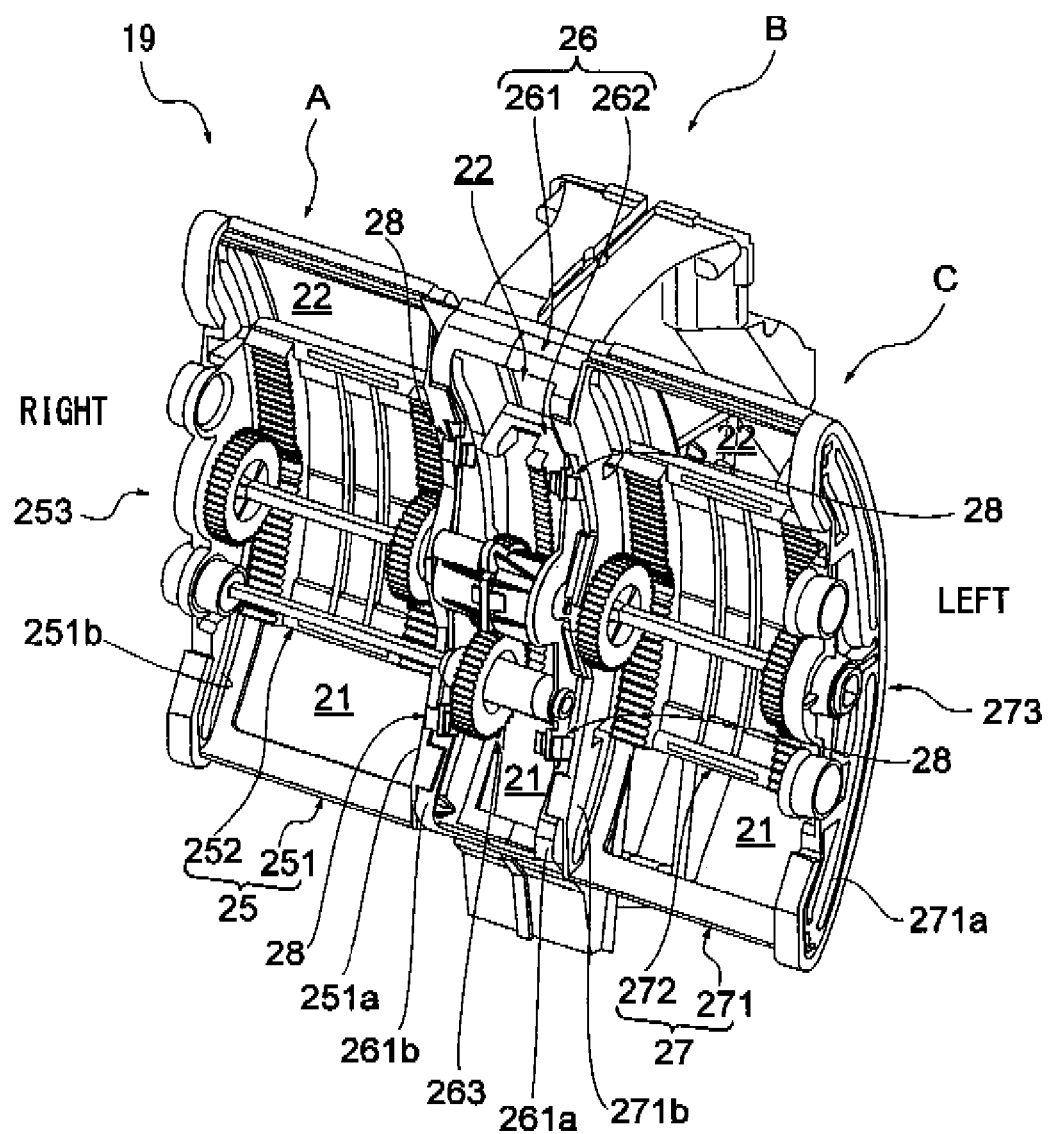
FIG. 13 is a perspective view illustrating an air mix door in FIG. 12 as seen from the front side of the vehicle.

As illustrated in FIG. 13, the air mix door 19 includes a left slide door unit (first slide door unit) 27, central sub-casing unit (sub-casing unit) 26 and right slide door unit (second slide door unit) 25. The central sub-casing unit 26, right slide door unit 25 and left slide door unit 27 are connected from side to side in parallel in accordance with each zone A-C.

The right slide door unit 25 includes a frame type right slide door casing (second slide door casing) 251, a right slide door (third door) 252 slidably supported to facing right and left side portions 251a, 251b of the right slide door casing 251, and a right slide door driver 253 which slides the right slide door 252.

The central sub-casing unit 26 includes a frame type central sub-casing (sub-casing) 261, a central slide door (first door) 262 slidably supported to facing right and left side portions 261a, 261b of the central sub-casing 261, and a central slide door driver 263 which slides the central slide door 262.

The left slide door 27 includes the frame type left slide door casing (first slide door casing) 271, a left slide door (second door) 272 slidably supported to facing right and left side portions 271a, 271b of the left slide door casing 271, and a left slide door driver 273 which slides the left slide door 272.

The slide doors 252-272 are supported inside the right slide door casing 251, left slide door casing 271 and central sub-casing 261, respectively, so that a cold air side opening 22 is formed in the upper side of each slide door casing and a warm air side opening 21 is formed in the lower side of each slide door casing. The air-conditioning air which has passed through the evaporator 15 is sent to the bypass air path 18 through the cold air side opening 22. This air which has passed through the evaporator 15 becomes cold air. The air-conditioning air which has passed through the evaporator 15 is sent to the heater core 16 through the warm air side opening 21. This air which has passed through the heater core 16 becomes warm air.

Each of the slide doors 252-272 slides by each of the slide door drivers 253-273, so that the areas of the warm air side opening 21 and the cold air side opening 22 are changed so as to change the mixture ratio of the cold air and the warm air. Accordingly, the temperature of the air-conditioning air which blows out from each outlet 5 is controlled.

A pair of up-and-down slide door casing connectors 28, 28, which detachably connects the adjacent right slide door casing 251 and central sub-casing 261 and the adjacent central sub-casing 261 and left slide door casing 271, is provided between the adjacent right slide door casing 251 and central sub-casing 261 and the adjacent central sub-casing 261 and left slide door casing 271.

At first, the left slide door casing connectors 28, 28 which detachably connect the central sub-casing 261 and left side door casing 271 will be described.

Figure 14:
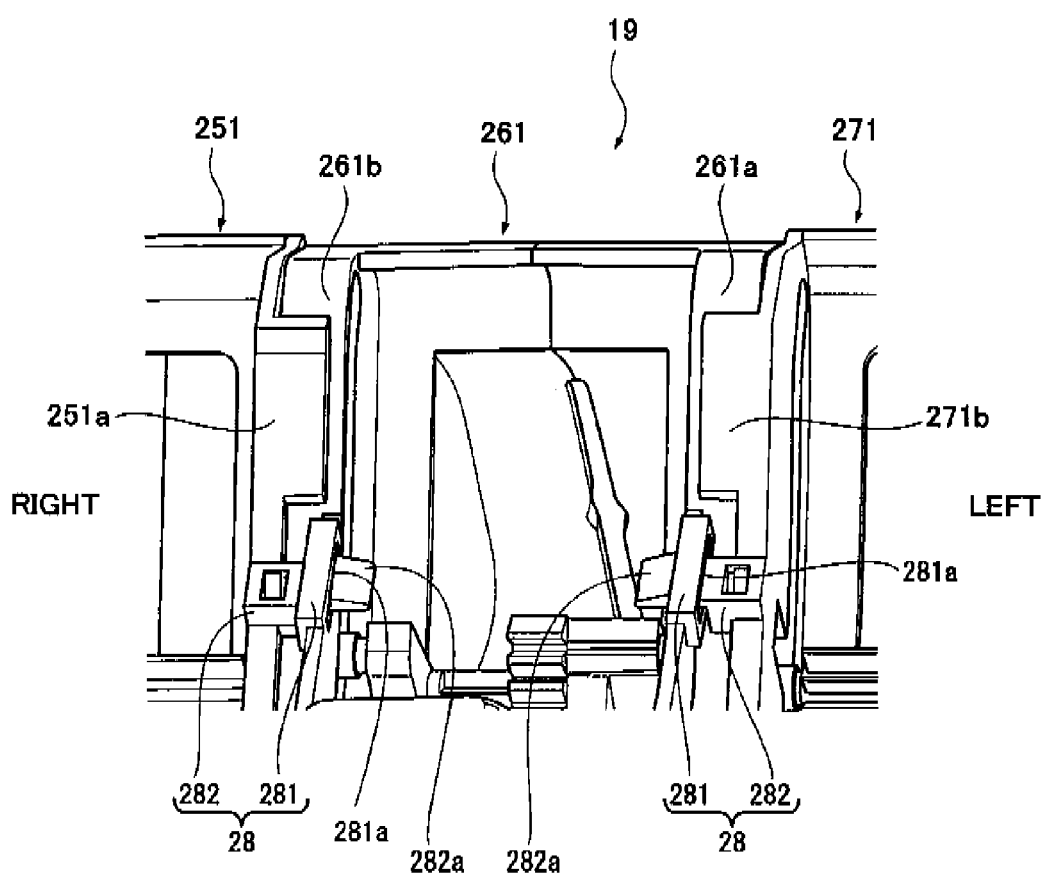
FIG. 14 is an enlarged view illustrating an upper portion of a central sub-casing unit in FIG. 13.

As illustrated in FIG. 14, the left slide door casing connectors 28, 28 detachably connect the adjacent side portions of the central sub-casing 261 and left slide door casing 271 (left side portion 261a of central sub-casing 261 and right side portion 271b of left slide door casing 271).

The left slide door casing connectors 28, 28 include portions 281 to be inserted (hereinafter, referred to as an inserted portion), which are provided in the upper and lower portions of the left side portion 261a of the central sub-casing 261, respectively, and insertion portions 281 which are provided in the upper and lower portions of the right side portion 271b of the left slide door casing 271, respectively.

A through-hole 281a is formed in each of the inserted portions 281. An insertion portion 282 projects to the right side, and a leading end portion 282a of the insertion portion 282 is inserted into the through-hole 281a. The leading end portion 282a is formed like a click having a triangular shape in cross section such that the thickness thereof is reduced toward the leading end, and is disengageably engaged in the through-hole 281a.

Figure 15:
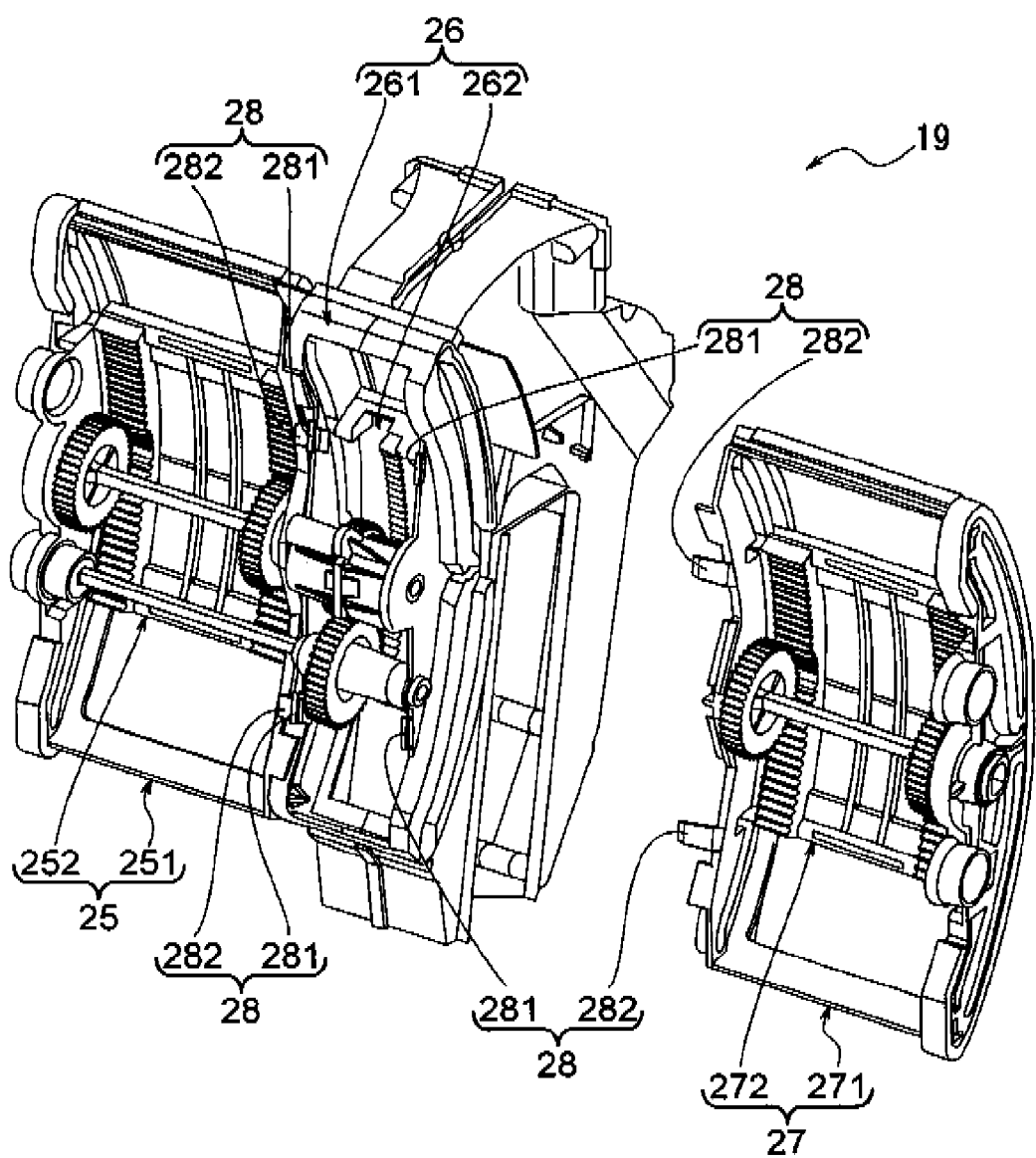
FIG. 15 is a perspective view illustrating a state in which a left slide door unit is removed from the state in FIG. 13.

The left slide door casing connectors 28, 28 detachably connect the left slide door unit 27 and central sub-casing unit 26 as illustrated in FIGS. 13, 15 by disengageably engaging the insertion portions 282, 282 in the inserted portions 281, 281.

Next, the right slide door casing connectors 28, 28 which detachably connect the central sub-casing 261 and the right slide door casing 251 will be described.

As illustrated in FIG. 14, the right slide door casing connectors 28, 28 detachably connect the adjacent side portions of the central sub-casing 261 and right slide door casing 251 (right side portion 261a of central sub-casing 261 and left side portion 251a of right slide door casing 251).

The right slide door casing connectors 28, 28 include portions 281 to be inserted (hereinafter referred to as an inserted portion), which are provided in the upper and lower portions of the right side portion 261b of the central sub-casing 261, respectively, and insertion portions 282 which are provided in the upper and lower portions of the left side portion 251a of the right slide door casing 251, respectively.

The inserted portion 281 and the insertion portion 282 of the right slide door casing connector 28 have configurations which are basically the same as those of the inserted portion 281 and the insertion portion 282 of the left slide door casing connector 28. The insertion portion 282 projects to the left side, and a leading end portion 282a of the insertion portion 282 is inserted into the through-hole 281a to be disengageably engaged therein.

The right slide door casing connectors 28, 28 detachably connect the right slide door casing 251 and central sub-casing 261 by disengageably engaging the insertion portions 282, 282 in the inserted portions 281, 281.

As described above, in the air mix door 19 of the present embodiment, the slide door casing connectors 28, 28 are provided between the adjacent right slide door casing 251 and the central sub-casing 261 and the central sub-casing 261 and the left slide door casing 271. With this configuration, the right and left slide door units 25, 27 and central sub-casing unit 26 are connected in advance by the slide door casing connectors 28 before disposing the air mix door 19 inside the air-conditioning casing 11 (refer to FIG. 12), and then the air mix door 19 can be disposed inside the air-conditioning casing 11 to be assembled in this state. Therefore, it becomes unnecessary to perform an operation which connects the right and left slide door units 25, 27 and central sub-casing unit 26 inside the air-conditioning casing 11, and thus, the air mix door 19 of the present embodiment can be easily assembled in the air-conditioning casing 11.

Moreover, in the air mix door 19 of the present embodiment, the adjacent side portions of the right slide door casing 251 and central sub-casing 261 and the adjacent side portions of the left slide door casing 271 and central sub-casing 261 are connected. With this configuration, the right and left slide door units 25, 27 and central sub-casing unit 26 can be easily connected. Therefore, the operation performance which assembles the air mix door 19 in the air-conditioning casing 11 can be improved.

Furthermore, in the air mix door 19 of the present embodiment, the adjacent right slide door casing 251 and the central sub-casing 261 and the adjacent left slide door casing 271 and central sub-casing 261 are connected by the slide door casing connectors 28, 28. With this configuration, the right and left slide door casings and central sub-casing can be connected without using a fastener such as a bolt. Therefore, in the air mix door 19 of the present embodiment, the right and left slide door units 25, 27 and central sub-casing unit 26 can be easily connected, and the assembling operation in the air-conditioning casing 11 can be further improved.

In the air mix door 19 of the present embodiment, the slide door casing connector 28 includes the inserted portion 281 and the insertion portion 282, and detachably connects the adjacent right slide door casing 251 and central sub-casing 261 and the adjacent left slide door casing 271 and central sub-casing 261 by the disengageable engagement between the insertion portion 282 and the inserted portion 281.

Namely, the right slide door casing 251 and central sub-casing 261 and the left slide door casing 271 and central sub-casing 261 are detachably connected by the simple configuration of the inserted portion 281 and the insertion portion 282. Accordingly, the right slide door unit 25 and central sub-casing unit 26 and the left slide door unit 27 and central sub-casing unit 26 can be easily connected at low cost. Therefore, the assembling operation of the air mix door 19 of the present embodiment in the air-conditioning casing 11 can be easily performed at low cost.

In addition, the configurations of the present embodiment can be applied to the vehicle air conditioner described in each of the first and second embodiments. For example, the slide door casing connector described in the present embodiment can be used for connecting the central sub-casing and the right and left slide door casings described in each of the first and second embodiments.

Moreover, the air mix door 19 described in the present embodiment corresponds to the air mix door described in each of the first and second embodiments.

Fourth Embodiment

Figure 16:
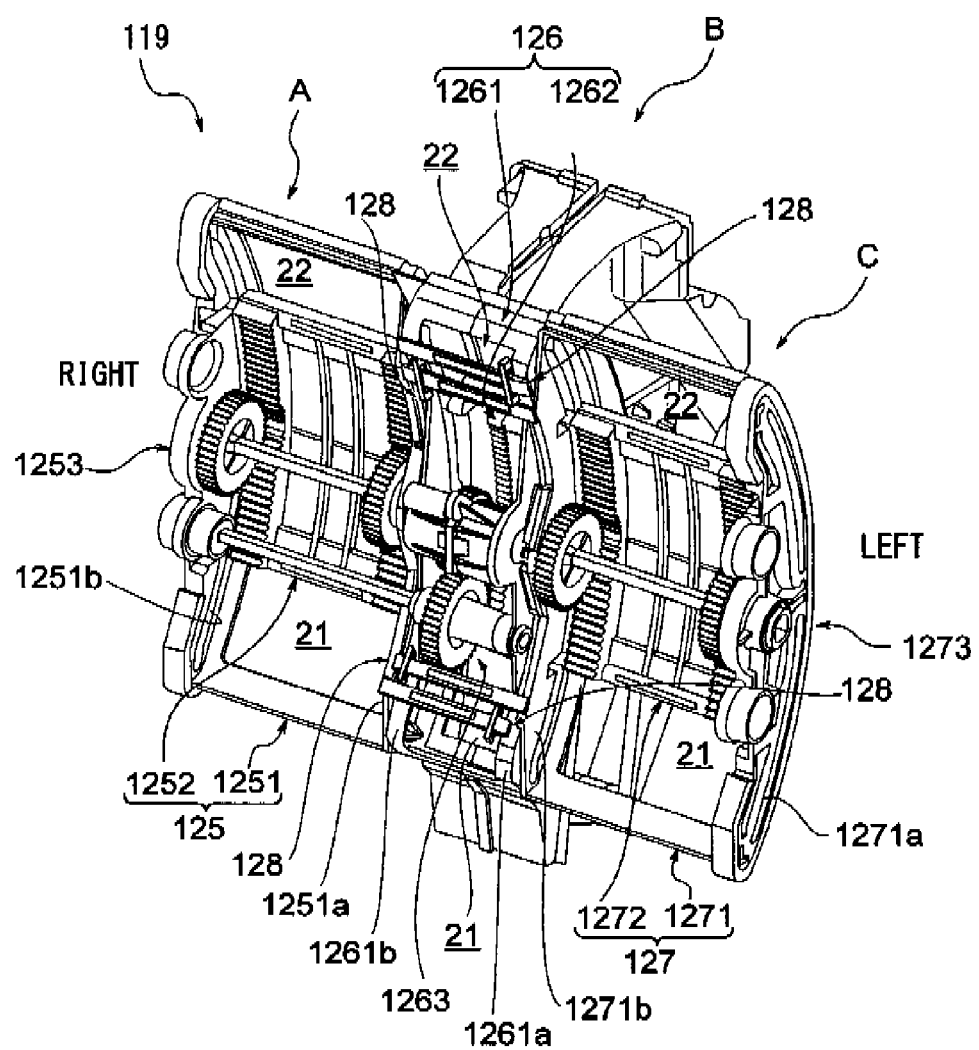
FIG. 16 is a perspective view illustrating an air mix door according to a fourth embodiment of the present invention as seen from the front side of the vehicle.

FIG. 16 is a perspective view illustrating an air mix door 119 according to a fourth embodiment of the present invention as seen from the front side of the vehicle. The same reference numbers are applied to the portions which are the same as those of the air mix door 119 of the third embodiment, and different portions will be hereinafter mainly described.

The air mix door 119 of the present embodiment includes a right slide door unit (second slide door unit) 125, central sub-casing unit (sub-casing unit) 126 and left slide door unit (first slide door unit) 127 similar to the air mix door 119 in the third embodiment. The right slide door unit 125, left slide door unit 127 and central sub-casing unit 126 are connected right and left in parallel in accordance with each zone A-C.

The right slide door unit 125 includes a frame shape right slide door casing (second slide door casing) 1251, a right slide door (third door) 1252 slidably supported to facing right and left side portions 1251a, 1251b of the right slide door casing 1251, and a right slide door driver 1253 which slides the right slide door 1252.

The central sub-casing unit 126 includes a frame shape central sub-casing (sub-casing) 1261, a central slide door (first door) 1262 which is slidably supported to facing right and left side portions 1261a, 1261b of the central sub-casing 1261 and a central slide door driver 1263 which slides the central slide door 1262.

The left slide door unit 127 includes a frame shape left slide door casing (first slide door casing) 1271, a left slide door (second door) 1272 which is slidably supported to facing right and left side portions 1271a, 1271b of the left slide door casing 1271 and a left slide door driver 1273 which slides the left slide door 1272.

A pair of up-and-down slide door casing connectors 128, 128 which detachably connects the right slide door casing 1251 and the central sub-casing 1261 and the central sub-casing 1261 and the left slide door casing 1271 is provided between the adjacent right slide door casing 1251 and the central sub-casing 1261 and the central sub-casing 1261 and the left slide door casing 1271.

The left slide door casing connectors 128, 128 which connect the left slide door casing 1271 and the central sub-casing 1261 will be described.

Figure 17:
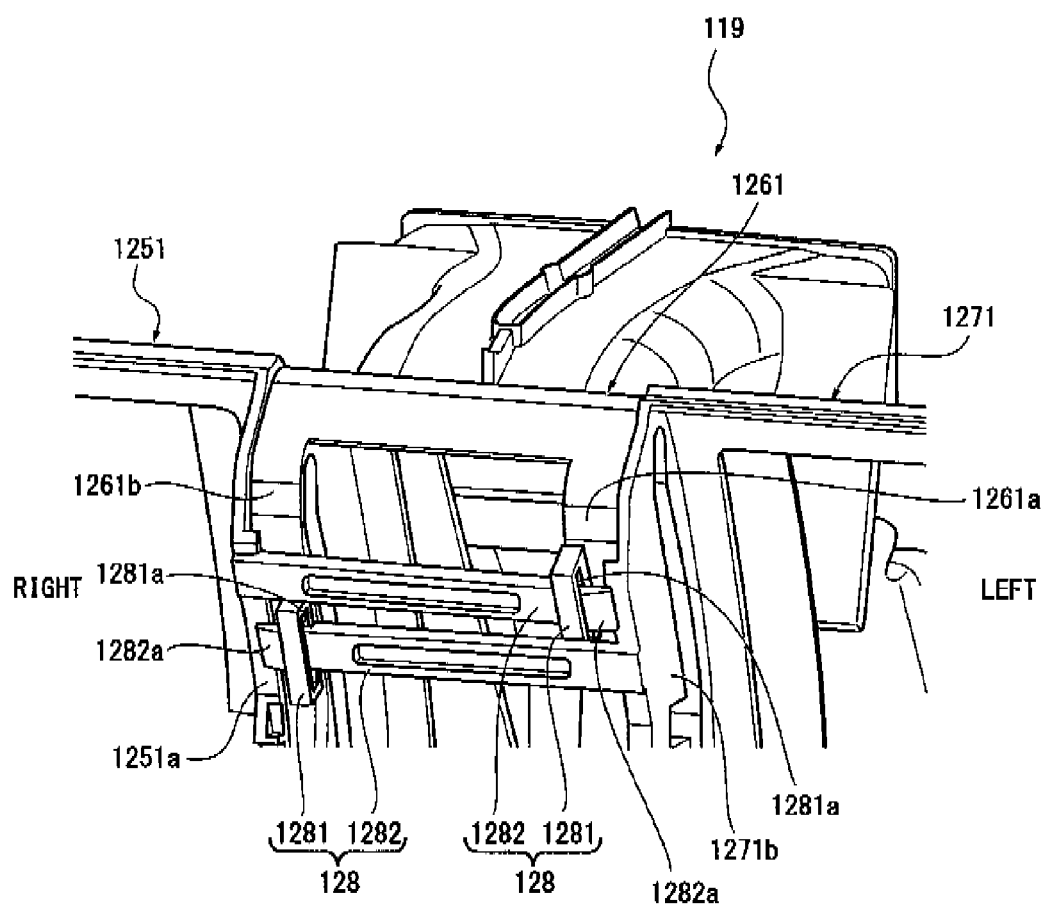
FIG. 17 is an enlarged view illustrating the upper portion of the central sub-casing unit in FIG. 16.

As illustrated in FIG. 17, the left slide door casing connectors 128, 128 connect a right side portion 1271b of the left slide door casing 1271 and a right side portion 1261b of the central sub-casing 1261.

The left slide door casing connectors 128, 128 include portions 1281 to be inserted (hereinafter referred to as an inserted portion), which are provided in the upper and lower portions of the right side portion 1261b of the central sub-casing 1261, respectively, and insertion portions 1282 which are provided in the upper and lower portions of the right side portion 1271b of the left slide door casing 1271, respectively.

A through-hole 1281a is formed in the inserted portion 1281. The insertion portion 1282 extends in the right direction, and a leading end portion 1282a of the insertion portion 1282 is inserted into the through-hole 1281a. The leading end portion 1282a is formed like a click having a rectangular shape in cross-section such that the thickness thereof is reduced toward the leading end, and is disengageably engaged in the through-hole 1281a.

As described above, the insertion portions 1282, 1282 are disengageably engaged in the inserted portions 1281, 1281, so that the left slide door casing connectors 128, 128 detachably connect the central sub-casing 1261 and the left slide door casing 1271.

Next, the right slide door casing connectors 128, 128 which connect the right slide door casing 1251 and the central sub-casing 1261 will be described.

As illustrated in FIG. 17, the right slide door casing connectors 128, 128 connect a left side portion 1251a of the right slide door casing 1251 and a left side portion 1261a of the central sub-casing 1261.

The right slide door casing connectors 128, 128 include portions 1281 to be inserted (hereinafter, referred to as an inserted portion), which are provided in the upper and lower portions of the left side portion 1261a of the central sub-casing 1261, respectively, and insertion portions 1282 which are provided in the upper and lower portions of the left side portion 1251a of the right slide door casing 1251, respectively.

The configurations of the inserted portion 1281 and the insertion portion 1282 of the right slide door casing connector 128 are basically the same as those of the inserted portion 1281 and the insertion portion 1282 of the left slide door casing connector 128. In this case, the insertion portion 1282 extends in the left direction, and a leading end portion 1282a is inserted into the through-hole 1281a of the insertion portion 1281 to be disengageably engaged therein.

As described above, the insertion portions 1282, 1282 are disengageably engaged in the inserted portions 1281, 1281, so that the right slide door casing connectors 128, 128 detachably connect the right slide door casing 1251 and the central sub-casing 1261.

In addition, the configurations of the present embodiment can be applied to the vehicle air conditioner described in each of the first and second embodiments. For example, the slide door casing connectors described in the present embodiment can be used for connecting the central sub-casing and the right and left slide door casings of the vehicle air conditioner described in each of the first and second embodiments.

Moreover, the air mix door 119 described in the present embodiment corresponds to the air mix door described in each of first and second embodiments.

As described above, in the air mix door 119 of the present embodiment, the slide door casing connector 128 is provided between the adjacent right slide door casing 1251 and the central sub-casing 1261 and the central sub-casing 1261 and the left slide door casing 1271. With this configuration, the right and left slide door units 125, 127 and the central sub-casing unit 126 are connected in advance by the slide door casing connector 128 before disposing the air mix door 119 in the air-conditioning casing 11 (refer to FIG. 12), and then, the air mix door 119 is assembled in the air-conditioning casing 11 in this condition. Accordingly, it becomes unnecessary to perform the operation which connects the right and left slide door units 125, 127 and the central sub-casing unit 126 in the air-conditioning casing 11. Therefore, the air mix door 119 of the present embodiment can be easily assembled in the air-conditioning casing 11.

In the air mix door 119 of the present embodiment, one of the adjacent side portions of the adjacent right slide door casing 1251 and central sub-casing 1261 and the side portion opposite to the other of the adjacent side portions of the adjacent right slide door casing 1251 and central sub-casing 1261 are connected, and one of the adjacent side portions of the adjacent left slide door casing 1271 and central sub-casing 1261 and the side portion opposite to the other of the adjacent side portions of the adjacent left slide door casing 1271 and central sub-casing 1261 are connected. With this configuration, the adjacent right slide door casing 1251 and central sub-casing 1261 and the adjacent left slide door casing 1271 and central sub-casing 1261 can be firmly connected. Accordingly, the workability of the assembling operation of the air mix door 119 of the present embodiment in the air-conditioning casing 11 can be improved.

When connecting the right slide door casing 1251, left slide door casing 1271 and central sub-casing 1261 as in the present embodiment, the right and left slide door casings 1251, 1271 are connected to the central sub-casing 1261 by the slide door casing connectors 128, 128 of the present embodiment. Therefore, the right and left slide door units 125, 127 and the central sub-casing unit 126 can be effectively prevented from being disconnected, and the operation which assembles the air mix door 119 in the air-conditioning casing 11 can be effectively improved.

In the third and fourth embodiments, the inserted portion is provided in the central sub-casing, and the insertion portion is provided in the right and left slide door casings, but the insertion portion can be provided in the central sub-casing and the inserted portion can be provided in the right and left slide door casings.

In the third embodiment, the slide door casing connector, which connects the adjacent sides of the adjacent right slide door casing and central sub-casing and the adjacent sides of the adjacent left side door casing and central sub-casing, is used, and in the fourth embodiment, the slide door casing connector, which connects one of the adjacent side portions of the adjacent right slide door casing and central sub-casing and the side portion opposite to the other of the adjacent side portions of the adjacent right slide door casing and central sub-casing and one of the adjacent side portions of the adjacent left slide door casing and central sub-casing and the side portion opposite to the other of the adjacent side portions of the adjacent left slide door casing and central sub-casing, is used. However, both of the slide door casing connectors in the third and fourth embodiments can be used together.

More specifically, the slide door connector for use in the third embodiment is used as the upper slide door connector or the lower slide door connector, and the slide door connector for use in the fourth embodiment is used as the upper slide door connector or the lower slide door connector.

As described above, the air mix door according to the present embodiment can be easily assembled in the air-conditioning casing. Therefore, the air mix door of the present embodiment can be effectively used in a technical field of an air mix door.

In the air mix door described in each of the third and fourth embodiments, the slide door casing connector is provided between the adjacent right slide door casing and central sub-casing and the adjacent left slide door casing and the central sub-casing. With this configuration, the central sub-casing unit and the right and left slide door units are connected in advance before disposing the air mix door in the air-conditioning casing, and then, the air mix door can be disposed in the air-conditioning casing in this condition. For this reason, it becomes unnecessary to perform the operation which connects the central sub-casing unit and the right and left slide door casing units. Accordingly, the air mix door can be easily assembled in the air-conditioning casing.

Embodiment 5

Hereinafter, a slide door unit of a vehicle air conditioner according to a fifth embodiment of the present invention will be described with reference to the drawings.

As illustrated in FIGS. 10, 11, 12, an air conditioner 2 is provided in a vehicle 1 such as an automobile.

This air conditioner 2 includes a main body 4 provided inside an instrument panel 3 disposed in the front portion of the vehicle interior and a duct 6 which sends air-conditioning air to an outlet 5 provided in each portion of the vehicle interior from the main body 4.

The main body 4 includes a hollow HVAC casing 11 and air inlet 12 and air outlet 13 provided in the HVAC casing 11.

The HVAC casing 11 includes inside thereof an evaporator 15 (heat exchanger for cooling) and a heater core 16 (heat exchanger for heating) in order from the windward side.

The leeward side of the evaporator 15 is divided into a warm air path 17 and a bypass air path 18 by a division wall. The heater core 16 is provided inside the warm air path 17.

An air mix door 19 capable of distributing air-conditioning air which has passed through the evaporator 15 to the warm air path 17 and the bypass air path 18 is provided between the evaporator 15 and the heater core 16. In this embodiment, the air mix door 19 includes an arc-like external appearance in a lateral view, which projects on the leeward side.

In this case, the evaporator 15 is configured to cool the air-conditioning air by using coolant evaporative latent heat for use in the air conditioner 2. The heater core 16 is configured to heat the air-conditioning air by using the heat of the coolant water heated by an engine.

Figure 18:
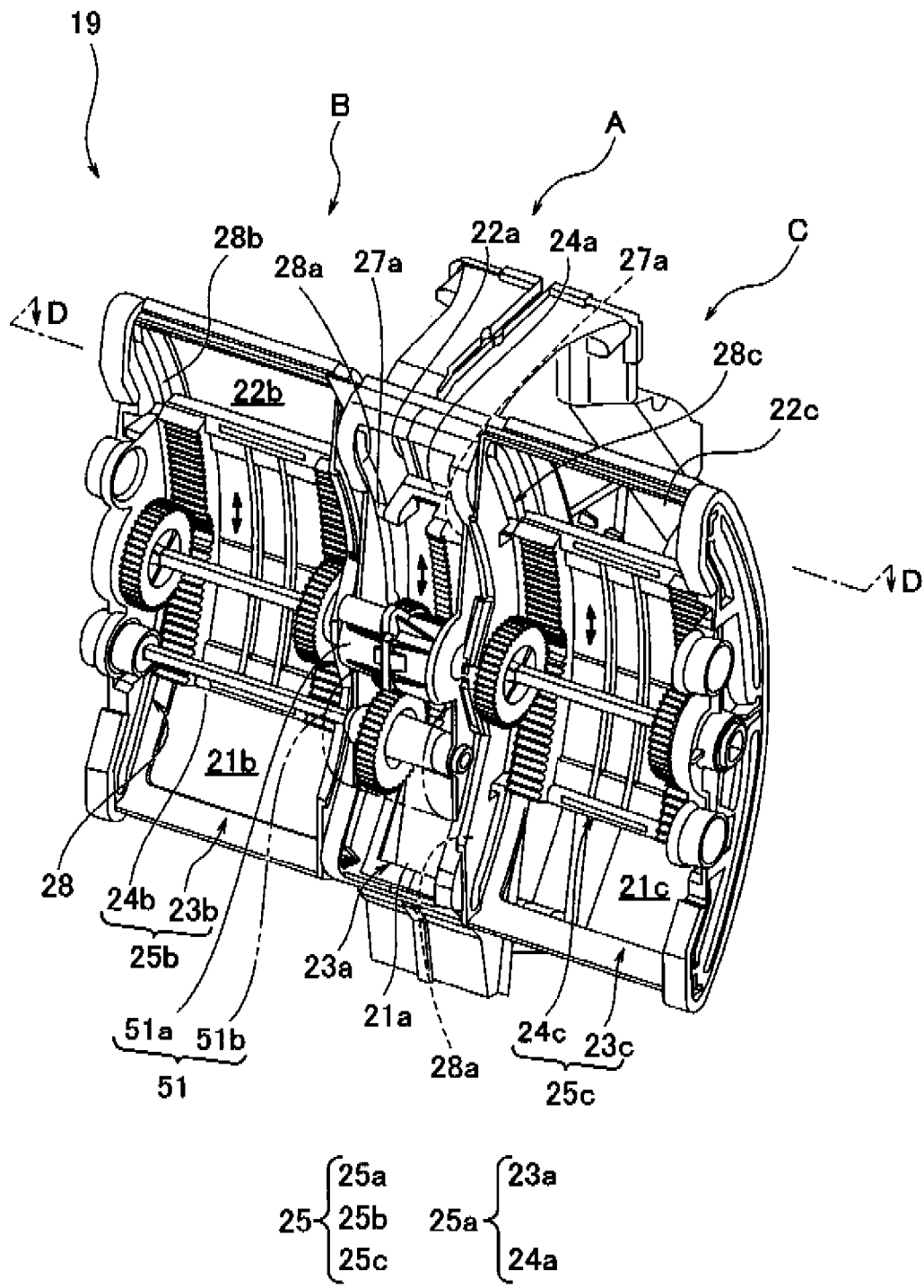
FIG. 18 is a perspective view illustrating an air mix door of an air conditioner according to a fifth embodiment of the present invention as seen from the front side of the vehicle.

The air mix door 19 is configured to control the air in a plurality of divided areas inside the main body 4 as illustrated in FIG. 18.

In the air mix door 19, a slide door unit 25 is configured such that a central sub-casing unit (sub-casing unit) 25a, right slide door unit (second slide door) 25b and left slide door unit (first slide door unit) 25c are connected in accordance with the divided three areas A-C of the area B for a driver's seat, the area C for a front passenger's seat and the area A for a back passenger's seat.

In this case, the central sub-casing unit 25a disposed in the center in the width direction among the central sub-casing unit 25a, the right slide door unit 25b and the left slide door unit 25c includes a central sub-casing (sub-casing) 23a having an opening frame and a slide door (first door) 24a which is formed to be smaller than the opening inside the opening frame, seals a part of the opening and is provided to be slidable along the opening frame.

The right slide door unit 25b connected to the left side of the central sub-casing unit 25a in the figure among the central sub-casing unit 25a, right slide door unit 25b and left slide door unit 25c also includes a right slide door casing (second slide door casing) 23b having an opening frame and a right slide door (third door) 24b which is formed to be smaller than the opening inside the opening frame, seals a part of the opening and is provided to be slidable along the opening frame.

The left slide door unit 25c connected to the right side of the central sub-casing unit in the figure among the central sub-casing unit 25a, right slide door unit 25b and left slide door unit 25c also includes a left slide door casing (first slide door casing) 23c having an opening frame and a left slide door (second door) 24c which is formed to be smaller than the opening inside the opening frame, seals a part of the opening and is provided to be slidable along the opening.

Each opening of the central sub-casing 23a and right and left slide door casings 23b, 23c has a rectangular shape, for example. Each slide door 24a, 24b, 24c is formed to be smaller than the rectangular shape of each opening of the central sub-casing 23a and right and left slide door casings 23b, 23c in the height direction, and each slide door 24a, 24b, 24c is slidable in the illustrated height direction along each opening frame of the central sub-casing 23a and right and left side door casings 23b, 23c.

Accordingly, a part of each opening is closed by the slide door 24a, 24b, 24c, but the ratio of the area of the opening in the upper portion (upper opening) 22a, 22b, 22c, which is not closed by the slide door 24a, 24b, 24c, and the area of the opening in the lower portion (lower opening) 21a, 21b, 21c, which is not closed by the slide door 24a, 24b, 24c, can be changed by sliding the slide door 24a, 24b, 24c in the sliding direction.

In this case, each upper opening 22a, 22b, 22c is formed to communicate with the bypass air path 18 in the HVAC casing 11. On the other hand, each lower opening 21a, 21b, 21c is formed to communicate with the warm air path 17 in the HVAC casing 11.

Therefore, in a state in which the slide door 24a slides on the lower side of the opening of the central sub-casing 23a, the area of the upper opening 22a becomes larger than the area of the lower opening 21a, the air volume which has passed through the bypass air path 18 through the upper opening 22a becomes larger than the air volume which has passed through the warm air path 17 through the lower opening 21a in the air-conditioning air which has passed through the evaporator 15, and the air temperature in the outlet 5 which is determined based on the mixture of the cold air volume which has passed through the bypass air path 18 and the warm air volume which has passed through the warm air path 17 is relatively reduced.

On the other hand, in a state in which the slide door 24a slides on the upper side of the opening of the central sub-casing 23a, the area of the upper opening 22a becomes smaller than the area of the lower opening 21a, the air volume which has passed through the bypass air path 18 through the upper opening 22a becomes smaller than the air volume which has passed through the warm air path 17 through the lower opening 21a, and the air temperature in the outlet 5 which is determined based on the mixture of the cold air volume which has passed through the bypass air path 18 and the warm air volume which has passed the warm air path 17 is relatively increased.

In a state in which the slide door 24a slides in an arbitrary position in a slidable area, the air temperature in the outlet 5 can be changed according to the slid position (stopped position).

The above description of the adjustment of the air temperature in the outlet 5 is for the central sub-casing unit 25a, but the above description can be applied to the right and left slide door units 25b, 25c. Thus, the description of the adjustment of the air temperature for the right and left slide door units 25b, 25c will be omitted.

Since the slide doors 24a, 24b, 24c of the central sub-casing unit 25a and right and left slide door units 25b, 25c are independently slidable, the air temperature in each outlet 5 corresponding to each of the central sub-casing unit 25a and right and left slide door units 25b, 25c can be adjusted.

Namely, the air temperature in the outlet 5 in the area A for a back seat corresponding to the central sub-casing unit 25a, the air temperature in the outlet 5 in the area B for a driver's seat corresponding to the right slide door unit 25b and the air temperature in the outlet 5 in the area C for a front passenger's seat corresponding to the left slide door unit 25c can be independently adjusted.

Figure 19:
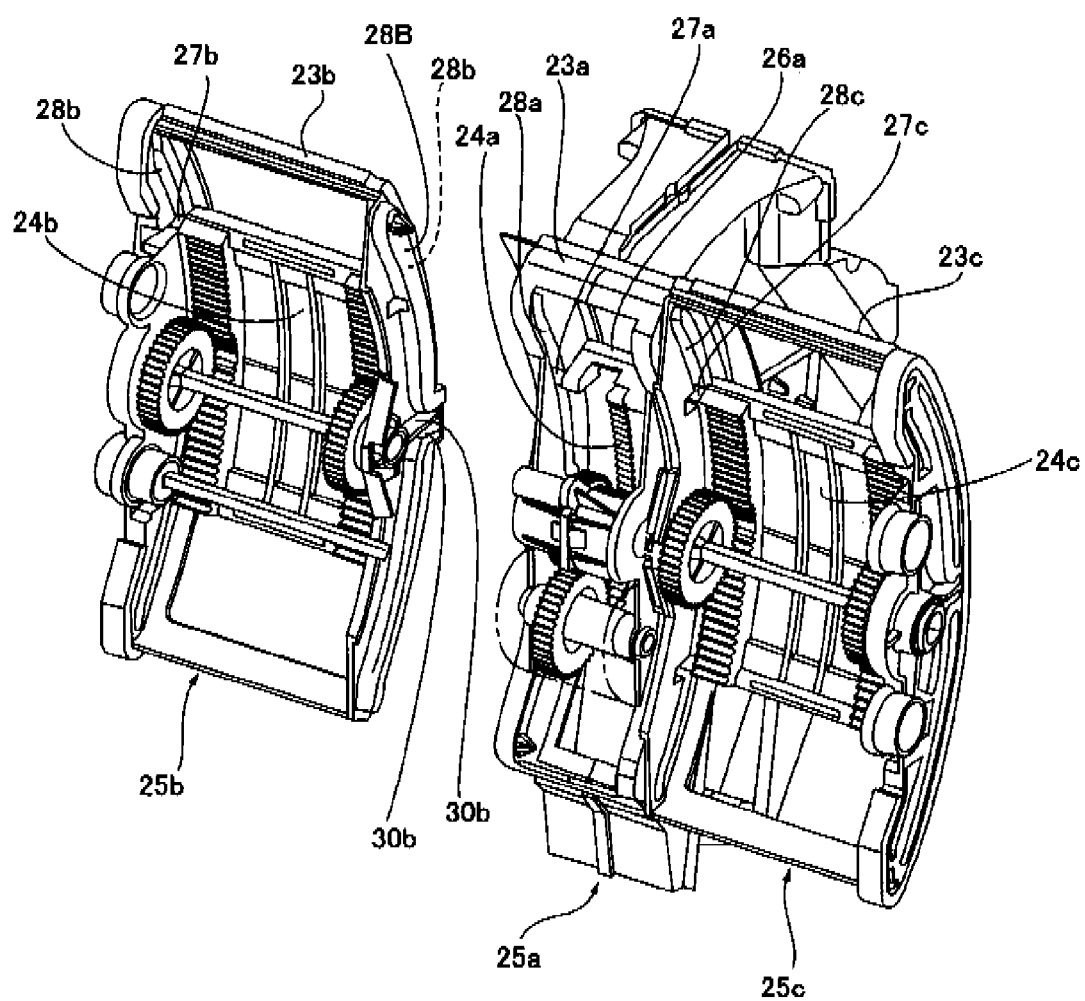
FIG. 19 is a perspective view illustrating a condition in which a right slide door unit is separated from a central sub-casing unit and a left slide door unit.

In this case, the central sub-casing unit 25a, right slide door unit 25b and left slide door unit 25c are integrated in the HVAC casing 11. However, as illustrated in FIG. 19, the central sub-casing unit 25a, right slide door unit 25b and left side door unit 25c are separately formed, so that the central sub-casing unit 25a and the right slide door unit 25b are separated and the central sub-casing unit 25a and the left slide door unit 25c are also separated.

Figure 20:
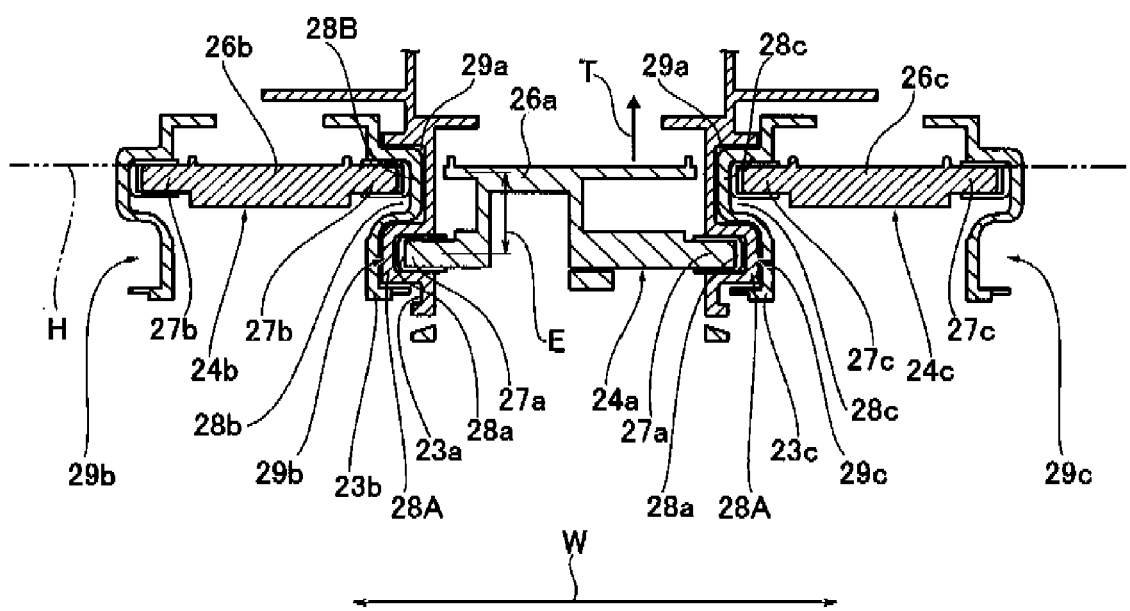
FIG. 20 is a sectional view along D-D line in FIG. 18 and is an exploded perspective view of the slide door in FIG. 19.

As illustrated in the sectional view of FIG. 20, the slide door 24a of the central sub-casing unit 25a includes guide pins 27a, 27a (supporting portions) which project outward along the width direction W from the door main body 26a (door main body portion), and guide grooves 28a, 28a (grooves) which extend along the height direction of the opening frame and into which the guide pins 27a, 27a are inserted. The guide grooves 28a, 28a are formed in the opening frame of the central sub-casing 23a so as to support the slide door 24a.

The guide pins 27a, 27a are formed in the positions offset by the length E along the flowing direction T of the air-conditioning air relative to the door main body 26a.

By the sliding of the guide pins 27a, 27a of the slide door 24a in the up and down direction along the guide grooves 28a, 28a, the slide door 24a becomes slidable in the up and down direction along the opening frame of the central sub-casing 23a.

The width between the end surfaces of the guide pins 27a, 27a is set to a length which does not fall from the guide grooves 28a, 28a, so that the slide door 24a is held in the central sub-casing 23a in a state in which the guide pins 27a, 27a are inserted into the guide grooves 28a, 28a.

In this case, peripheral walls 28A, 28A which form the guide grooves 28a, 28a of the central sub-casing 23a are convex portions which project outward of the central sub-casing 23a (the width direction W expanding direction in the sectional view of FIG. 20) by the depths of the guide grooves 28a, 28a.

With this configuration, the portions of the opening frame of the central sub-casing 23a (the portions where the convex portions are not formed) adjacent to the convex portions of the peripheral walls 28A, 28A of the guide grooves 28a, 28a along the flowing direction T of air-conditioning air become concave portions 29a, 29a which dent relative to the convex portions.

The offset amount E (length E) of the door main body 26a relative to the guide pins 27a, 27a inserted into the guide grooves 28a, 28a is set such that the door main body 26a is disposed in the position where the concave portions 29a, 29a are formed in the direction T in which the air-conditioning air flows in the opening.

Figure 21:
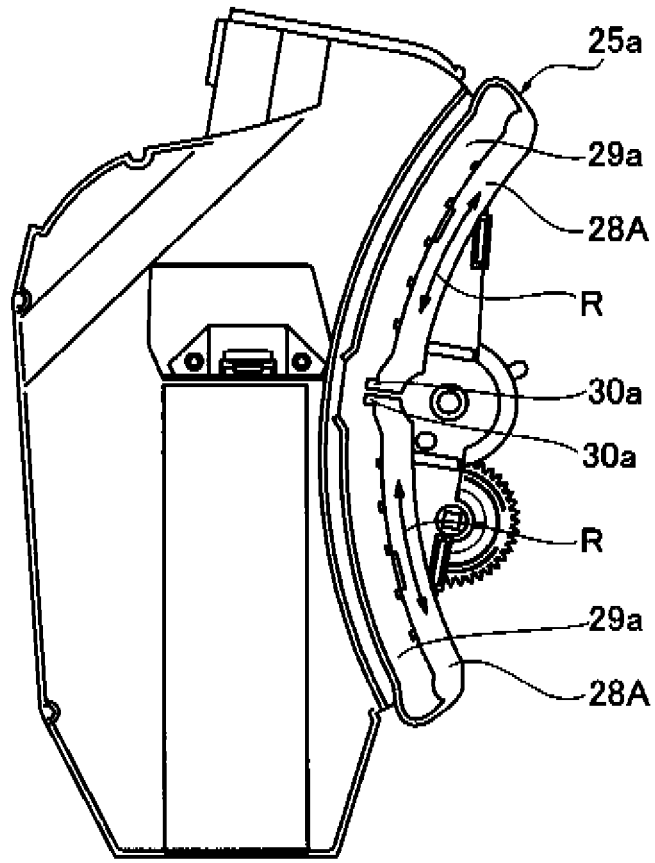
FIG. 21 is a side view illustrating a side surface of the central sub-casing unit, which is connected to the right slide door unit.

The convex portion which is the peripheral wall 28A, 28A of the guide groove 28a, 28a does not have a constant contour shape along the peripheral wall 28A extending direction R (guide groove 28a extending direction) as illustrated in the side view of FIG. 21 (the surface on the side to which the right slide door unit 25b is connected). For example, a projection portion 30a, 30a projecting in the direction orthogonal to the peripheral wall 28A extending direction R is formed in a part of the peripheral wall 28A. As a result, the concave portion 29a includes a cutout corresponding to the projection portion 30a.

On the other hand, as illustrated in the sectional view of FIG. 20, the right slide door 24b of the right slide door unit 25b includes guide pins 27b, 27b (supporting portions) projecting outward along the width direction W from the door main body 26b (door main body portion), and guide grooves 28b, 28b, which extend along the side in the height direction of the opening frame and into which the guide pins 27b, 27b are inserted, are formed in the right slide door casing 23b.

In this case, the guide pins 27b, 27b are formed in the same positions as that of the door main body 26b along the direction in which the air-conditioning air flows in the opening.

By the sliding of the guide pins 27b, 27b of the right slide door 24b along the guide grooves 28b, 28b in the up and down direction, the right slide door 24b becomes slidable in the up and down direction along the opening frame of the right slide door casing 23b.

The width between the end surfaces of the guide pins 27b, 27b is set to a length which does not fall from the guide grooves 28b, 28b, so that the right slide door 24b is held in the right slide door casing 23b in a state in which the guide pins 27b, 27b are inserted into the guide grooves 28b, 28b.

In this case, the circumference walls 28B, 28B which form the guide grooves 28b, 28b of the right slide door casing 23b become convex portions which project outward (the width direction W extending direction in the sectional view of FIG. 20) of the right slide door casing 23b by the depths of the guide grooves 28b, 28b.

Therefore, the portions of the opening frame of the right slide door casing 23b (the portions which are not formed as the convex portions) adjacent to the convex portions which are the periphery walls 28B, 28B of the guide grooves 28b, 28b along the direction T in which the air-conditioning air flows in the opening become concave portions 29b, 29b which dent relative to the convex portions.

A cutout 30b, 30b (refer to FIG. 19) which receives the projection portion 30a, 30a is formed in the portion corresponding to the projection portion 30a, 30a of the concave portion 29a of the central sub-casing unit 25a in the periphery wall 28B, 28B of the convex portion.

Since the left slide door unit 25c has the same configuration as that of the right slide door unit 25b, the description thereof will be omitted.

The periphery wall 28B of the convex portion of the right slide door unit 25b is engaged with the concave portion 29a on the right side of the central sub-casing unit 25a (on the side in which the right slide door unit 25b is arranged along the width direction W in FIG. 20). This engagement is defined by the contour shapes of the convex and concave portions, and this concave portion 29a acts as the positioning portion by the engagement, so that the central sub-casing unit 25a and the right slide door unit 25b can be easily connected in a specific positional relationship.

Moreover, since the projection 30a, 30a formed in the concave portion 29a of the central sub-casing unit 25a is engaged with the cutouts 30b, 30b formed in the convex portion (periphery wall 28B) of the facing right slide door unit 25b, the central sub-casing unit 25a and the right slide door unit 25b can be positioned along the slide door 24a, 24b sliding direction (guide groove 28a extending direction).

On the other hand, the periphery wall 28C of the convex portion of the left slide door unit 25c is engaged with the concave portion 29a on the left side of the central sub-casing unit 25a (the side in which the left slide door unit 25c is arranged along the width direction W in FIG. 20). This engagement is also defined by the contour shapes of the convex and concave portions, and the concave portion 29a acts as the positioning portion by this engagement, so that the central sub-casing unit 25a and the left slide door unit 25c can be easily connected in a specific positional relationship.

Since the projection portion 30a, 30a formed in the concave portion 29a of the central sub-casing unit 25a is engaged with the cutout (not shown, but corresponding to the cutout 30b, 30b formed in the right slide door unit 25b) formed in the convex portion (periphery wall 28C) of the facing left slide door unit 25c, the central sub-casing unit 25a and the left slide door unit 25c can be positioned along the slide doors 24a, 24a sliding direction (guide groove 28a extending direction R).

As described above, according to the slide door unit 25 of the air conditioner 2 of the fifth embodiment of the present invention, the central sub-casing unit 25a, right slide door unit 25b and left side door unit 25c can be integrally connected with a simple configuration such as concave and convex portions.

According to the slide door unit 25 of the air conditioner 2 of the fifth embodiment of the present invention, the central sub-casing unit 25a, right slide door unit 25b and the left side door unit 25*c* are connected in a specific positional relationship by the contour shapes of the concave and convex portions to be integrated, so that the connection operation can be easily performed without additionally providing a positioning pin or a hole into which the pin is inserted.

According to the slide door unit 25 of the air conditioner 2 of the present embodiment, the slide door 24*a* of the central sub-casing unit 25*a* includes the door main body 26*a* and the guide pin 27*a* which is inserted in the guide groove 28*a* to hold the door main body 26*a* in the central sub-casing 23*a*, and is offset by the length E in the thickness direction of the door main body 26*a*, namely, the flowing direction T of the air-conditioning air which flows in the opening relative to the door main body 26*a*. As a result, the door main body 26*a* of the slide door 24*a* of the central sub-casing unit 25*a* and the door main body 26*c* of the left slide door 24*c* of the left side door unit 25*c* and the door main body 26*b* of the right slide door 24*b* of the right slide door unit 25*b* which are connected to the right and left of the slide door 24*a* are disposed on the same plane H relative to the flowing direction T of the air-conditioning air which flows in the opening as illustrated in FIG. 20.

Therefore, the positions of the upper openings 22*a*, 22*b*, 22*c* which open and close by the door main bodies 26*a*, 26*b*, 26*c* along the flowing direction T of the air-conditioning air which flows in the opening can be aligned. Similarly, the positions of the lower openings along the flowing direction T of the air-conditioning air which flows in the opening can be aligned (arranged on the same plane in the flowing direction T of the air-conditioning air which flows in the opening).

Accordingly, the distance from each lower opening 21*a*, 21*b*, 21*c* to the heater core 16 can be the same distance, and the length from each upper opening 22*a*, 22*b*, 22*c* to the bypass air path 18 can be the same length.

For this reason, the difference in the temperature adjustment of the air-conditioning air among the central sub-casing unit 25*a*, right slide door unit 25*b* and the left slide door unit 25*c* can be prevented.

According to the slide door unit 25 of the air conditioner 2 of the present embodiment, not only are the periphery wall 28B of the convex portion of the right slide door unit 25*b* and the periphery wall 28C of the convex portion of the left slide door unit 25*c* engaged with the concave portions 29*a*, 29*a* of the central sub-casing unit 25*a*, but also the periphery walls 28A, 28A of the convex portions of the central sub-casing unit 25*a* are engaged with the concave portion 29*b* of the right slide door unit 25*b* and the concave portion 29*c* of the left slide door unit 25*c*, so that they can be strongly connected.

According to the central sub-casing unit 25*a* of the air conditioner 2 of the present embodiment, the slide door 24*a* includes the door main body 26*a* and the guide pins 27*a*, 27*a* which are inserted into the guide grooves 28*a*, 28*a* to hold the door main body 26*a* in the central sub-casing 23*a* and are offset in the thickness direction of the door main body 26*a* relative to the door main body 26*a*. The door main bodies 26*b*, 26*c* of the two right and left slide door units 25*b*, 25*c* adjacent to the central sub-casing unit 25*a* and the door main body 26*a* of the central sub-casing unit 25*a* are disposed on the same plane in the flowing direction T of the air-conditioning air which flows in the opening, so that a plurality of door main bodies 26*a*, 26*b*, 26*c* are arranged on the same plane, and the length of the door main body 26*a*, 25*b*, 26*c* in the width direction W, namely, the width of each opening which is closed by the door main body 26*a*, 26*b*, 26*c* can be increased while increasing the engagement portion of the guide groove 28*a*, 28*a* and the guide pin 27*a*, 27*a*. Thus, the door main body 26*a* can be strongly held in the opening frame of the central sub-casing unit 25*a*.

According to the slide door unit of the air conditioner of the present embodiment, the central sub-casing unit and the right and left slide door units can be easily integrated in a state in which they are positioned in a specific positional relationship with a simple configuration.

According to the configuration of the present embodiment, the distance from the position of each opening (position of slide door) to the position of the heater core can be the same distance. The length from the position of each opening (position of slide door) to the position of the bypass air path can be the same length.

Accordingly, the difference in the temperature adjustment of the air-conditioning air can be prevented among the central sub-casing unit and the right and left slide door unit.

According to the slide door unit of the air conditioner of the present embodiment, a plurality of door main bodies can be arranged on the same plane, and the length of the door main body in the width direction, namely, the width of the opening can be increased while increasing the engagement portion between the groove and the supporting portion. Thus, the door main body can be strongly held in the opening frame.

According to the slide door unit of the vehicle air conditioner of the present embodiment, the central sub-casing unit and the right and left slide door units can be easily integrated with a simple configuration.

In addition, the configuration described in the present embodiment can be applied to the configuration described in each of the first to fourth embodiments. For example, the configuration which connects the central sub-casing and the right and left slide door casings by the engagement of the convex portion and the concave portion can be applied to the configuration described in each of the first to fourth embodiments.

In this case, the connection configuration by the engagement of the convex portion and the concave portion described in the present embodiment can be used together with the slide casing connector described in each of the third and fourth embodiments.

The slide door unit of the present embodiment corresponds to the air mix door described in each of the first and second embodiments, and also corresponds to the air mix door described in each of the third and fourth embodiments.

Although the embodiments of the present invention have been described above, the present invention is not limited thereto. It should be appreciated that variations may be made in the embodiments described by persons skilled in the art without departing from the scope of the present invention.

What is claimed is:

1. A vehicle air conditioner, comprising:
   an evaporator configured to cool air;
   a heater core provided on a downstream side of the evaporator;
   a plurality of doors provided between the evaporator and the heater core, the plurality of doors being configured to adjust the volume of the air cooled in the evaporator, which flows to the heater core, and the volume of the cooled air, which flows on a downstream side of the heater core through a bypass air path, the plurality of doors being configured to mix air which has passed through the bypass air path and air which has passed through the heater core, and change a ratio of the volume of the air passing through the bypass air path and the volume of the air passing through the heater core by adjusting an opening, so as to adjust a temperature of the mixed air;

a central air path formed on the downstream side of the evaporator, and provided with a first door of the plurality of doors;

a first side air path formed on a first side of the central air path, and provided with a second door of the plurality of doors;

a second side air path formed on a second side of the central air path, and provided with a third door of the plurality of doors;

a sub-casing configured to form the central air path, the sub-casing including facing side portions;

a first division casing and a second division casing configured to sandwich the sub-casing;

a sub-casing unit including the sub-casing, the first door configured to change the ratio of the volume of the air passing through the bypass air path and the volume of the air passing through the heater core by sliding, and a moving mechanism configured to slide the first door;

a first slide door unit provided in a first side of the sub-casing unit; and a second slide door unit provided in a second side of the sub-casing unit, wherein:

the sub-casing and the first division casing form the first side air path, the sub-casing and the second division casing form the second side air path, the first slide door unit and the second slide door unit sandwich the sub-casing unit, the sub-casing unit includes the sub-casing and the first door slidably supported at the facing side portions of the sub-casing, the first slide door unit includes a first slide door casing, the first slide door casing including facing side portions, and the first slide door unit includes the second door slidably supported at the facing side portions of the first slide door casing, the second slide door unit includes a second slide door casing, the second slide door casing including facing side portions, and the second slide door unit includes the third door slidably supported at the facing side portions of the second slide door casing, and a slide door casing connector configured to detachably connect the first slide door casing and the sub-casing and the second slide door casing and the sub-casing is provided between the first slide door casing and the sub-casing and the second slide door casing and the sub-casing.

2. The vehicle air conditioner according to claim 1, wherein flanges facing each other are formed in each of the first division casing and the second division casing, the flanges being jointed to connect the first division casing and the second division casing, so that the sub-casing is sandwiched by the first division casing and the second division casing.

3. The vehicle air conditioner according to claim 2, wherein a flange is formed in an outside surface of the sub-casing, and the flange is sandwiched by the flanges of the first division casing and the second division casing.

4. The vehicle air conditioner according to claim 1, wherein the slide door casing connector is configured to detachably connect adjacent side portions of the first slide door casing and the sub-casing and adjacent side portions of the second slide door casing and the sub-casing.

5. The vehicle air conditioner according to claim 1, wherein the first slide door casing includes adjacent side portions and the second slide door casing includes adjacent side portions, and wherein the slide door casing connector is configured to connect a first of the adjacent side portions of the adjacent first slide door casing and the sub-casing and a side portion opposite to a second of the adjacent side portions of the adjacent first slide door casing and the sub-casing and to connect a first of the adjacent side portions of the adjacent second slide door casing and the sub-casing and a side portion opposite to a second of the adjacent side portions of the adjacent second slide door casing and the sub-casing.

6. The vehicle air conditioner according to claim 1, wherein the slide door casing connector is configured to detachably connect the first slide door casing and the sub-casing and the second slide door casing and the sub-casing by disengageable engagement of the first slide door casing and the sub-casing and the second slide door casing and the sub-casing.

7. The vehicle air conditioner according to claim 6, wherein:

the slide door casing connector includes an inserted portion provided in one of the adjacent first slide door casing and the sub-casing and one of the adjacent second slide door casing and the sub-casing, and an insertion portion provided in the other of the adjacent first slide door casing and the sub-casing and the other of the adjacent second slide door casing and the sub-casing, the insertion portion being inserted into the inserted portion, and the adjacent first slide door casing and the sub-casing and the adjacent second slide door casing and the sub-casing are detachably connected by disengageable engagement of the insertion portion and the inserted portion.

* * * * *